US010021461B2

(12) United States Patent
Roe et al.

(10) Patent No.: US 10,021,461 B2
(45) Date of Patent: Jul. 10, 2018

(54) SYSTEMS AND METHODS FOR PERFORMING AN ACTION BASED ON CONTEXT OF A FEATURE IN A MEDIA ASSET

(71) Applicant: Rovi Guides, Inc., Santa Clara, CA (US)

(72) Inventors: Glen E. Roe, Simi Valley, CA (US); Michael K. McCarty, Agoura Hills, CA (US)

(73) Assignee: Rovi Guides, Inc., San Jose, CA (US)

( * ) Notice: Subject to any disclaimer, the term of this patent is extended or adjusted under 35 U.S.C. 154(b) by 47 days.

(21) Appl. No.: 15/056,733

(22) Filed: Feb. 29, 2016

(65) Prior Publication Data
US 2017/0251272 A1    Aug. 31, 2017

(51) Int. Cl.
| G06F 3/00 | (2006.01) |
| G06F 13/00 | (2006.01) |
| H04N 5/445 | (2011.01) |
| H04N 21/488 | (2011.01) |
| H04N 21/435 | (2011.01) |
| H04N 21/482 | (2011.01) |

(52) U.S. Cl.
CPC ....... *H04N 21/4882* (2013.01); *H04N 21/435* (2013.01); *H04N 21/482* (2013.01)

(58) Field of Classification Search
CPC . H04N 21/4882; H04N 21/435; H04N 21/482
See application file for complete search history.

(56) References Cited

U.S. PATENT DOCUMENTS

| 7,653,921 B2 | 1/2010 | Herley |
| 7,769,756 B2 | 8/2010 | Krikorian et al. |
| 2002/0124252 A1 | 9/2002 | Schaefer et al. |
| 2002/0176689 A1 | 11/2002 | Heo et al. |
| 2006/0187358 A1 | 8/2006 | Lienhart et al. |
| 2007/0104348 A1 | 5/2007 | Cohen |
| 2009/0234727 A1* | 9/2009 | Petty ................. G06F 17/30306 705/14.54 |
| 2011/0016492 A1 | 1/2011 | Morita |
| 2012/0150990 A1 | 6/2012 | Liou |
| 2012/0167146 A1* | 6/2012 | Incorvia ......... H04N 21/234318 725/60 |
| 2013/0067513 A1 | 3/2013 | Takami |
| 2014/0267770 A1* | 9/2014 | Gervautz ........... H04N 5/23296 348/169 |
| 2015/0134668 A1* | 5/2015 | Popovich ............ G06F 17/3082 707/741 |

* cited by examiner

*Primary Examiner* — Kyu Chae
(74) *Attorney, Agent, or Firm* — Haley Guiliano LLP

(57) ABSTRACT

Systems and methods are provided herein for performing an action based on a feature in a media asset. In many media assets, specific features appear at portions of a program that users find interesting. These features can be compared with a database of stored objects that commonly appear in media assets to determine the object corresponding to the feature. The context of the object in the media asset then may be determined so that an appropriate action is selected for the system to take.

16 Claims, 21 Drawing Sheets

400

| Down and Distance Arrow | |
|---|---|
| Context | Action |
| 1st + 10 | Skip to |
| 2nd + 10 | No Action |
| 3rd + 10 | No Action |
| 4th + 10 | Skip from |
| 1st + Goal | Display Statistics for Close to Goal |

402 — Context
404 — Action

FIG. 4

SYSTEMS AND METHODS FOR PERFORMING AN ACTION BASED ON CONTEXT OF A FEATURE IN A MEDIA ASSET

BACKGROUND

Many viewers of media content, specifically television programs, find that they are not interested in large portions of the provided content. Some viewers record programs in order to skip around to the aspects of the programs they enjoy. Others relentlessly switch between content sources in an attempt to find a portion of a program that they find entertaining. However, these methods are inefficient as users are essentially guessing whether the content they select will be at a point that is interesting to them.

SUMMARY

Accordingly, systems and methods are provided herein for performing an action based on a feature in a media asset. In many media assets, specific features appear at portions of a program that users find interesting. These features can be compared with a database of stored objects that commonly appear in media assets to determine an appropriate action for the system to take.

In some instances, context of the object may be needed to determine an appropriate action. For example, directly before the beginning of every play in a football game, an arrow is displayed. However, just because a play is about to occur does not mean the user would find the play interesting. Instead, the arrow has to be given context with respect to the football game. For example, if text displayed with the arrow indicates, "$1^{st}$+Goal," the play may be more interesting to the user than other plays, since there is an imminent possibility of scoring points, and may have a different action associated with the arrow indicating "$1^{st}$+Goal." The system may perform a specific action once an object is detected, such as skipping to the playback point where the object appears, or transmitting data related to the media asset to a mobile device if the user is not currently accessing the media asset.

In some aspects, a media guidance application may store a plurality of objects. For example, the media guidance application may maintain a database stored in memory of objects containing information about media assets they commonly apply to, contexts where the objects appear, and properties of the objects.

In some embodiments, the media guidance application may create the feature. For example, either automatically by the media guidance application or by a user, the media guidance application may receive a selection of a particular feature, such as an arrow. The media guidance application may then associate the created feature with a plurality of media assets, where the plurality of media assets contain similar content. For example, if the media guidance application determines that the arrow is commonly displayed in football and hockey games, it may associate the arrow object with sporting events. The media guidance application may then store the created feature as the first object in a library of objects associated with the plurality of media assets. For example, the media guidance application may store the properties associated with the arrow feature in an arrow object in a library containing other objects associated with sporting events. The media guidance application may then generate an overlay with the first object on the media asset. For example, upon receiving an indication, such as a signal in a data packet of a media asset stream, the media guidance application may overlay the arrow object on the media asset.

In some aspects, the media guidance application receives at least one frame of the media asset. For example, the media guidance application may record an entire football game and examine each of the frames of the game for an object. Alternatively, the media guidance application may examine the frames in live programming for objects as the frames are received. Alternatively, the media guidance application may store a buffer of live programming such that a number of frames before the currently displayed frame, after the currently displayed frame, or both, are analyzed to determine if any of the frames contain objects.

In some aspects, the media guidance application may determine a feature in the at least one frame of the media asset. For example, the media guidance application may determine that an arrow feature is present in the at least one frame.

In some embodiments, the media guidance application may analyze a pixel map associated with the at least one frame of the media asset. For example, the media guidance application may define a pixel map for a frame in the media asset, where each pixel in the frame has a distinct position. The media guidance application may then analyze a group of pixels in the pixel map. For example, the media guidance application may iteratively compare one pixel to other nearby pixels in the pixel map.

The media guidance application may then determine shared properties of a subset of pixels in the group of pixels. For example, the media guidance application may determine that every pixel in a particular horizontal line has similar properties. The media guidance application may generate a table for the feature containing relative positions and properties of pixels in the subset of pixels. For example, the media guidance application may store the relative positions of a horizontal line feature, defined by the subset of pixels, as coordinates as well as any additional properties, such as color and brightness, in a table or other data structure.

In some aspects, the media guidance application may compare the feature to each of the stored plurality of objects to identify a first object of the stored plurality of objects that corresponds to the feature. For example, in response to determining that the at least one frame contains the arrow feature, the media guidance application may compare the properties of the arrow feature with the properties of objects stored in memory. The media guidance application may compare the feature to objects based on the genre, channel, or other commonalities of media assets for which the media guidance application has defined a library of objects.

In some embodiments, the media guidance application defines the feature by a first table containing relative positions and properties of a first plurality of pixels. For example, the media guidance application may store coordinates and properties for every pixel in separate rows of a table. The media guidance application may store a tolerance factor. The tolerance factor may define how closely the properties of the feature detected need to match the properties of the object stored in the database in order for a match to be returned. For example, the media guidance application may store a tolerance factor of 1, which may mean the properties must match exactly. Alternatively, the media guidance application may store a tolerance factor of 30, which may mean the properties do not need to be very close to return a match.

The media guidance application may then access a first pixel position of a first pixel stored in the first table. For example, the media guidance application may retrieve the coordinates of the first pixel position from the first table. For instance, the media guidance application may retrieve (5,10) as the relative coordinates of a first pixel in the (x,y) plane. The media guidance application may then compute an upper limit based on multiplying coordinates of the first pixel position by the tolerance factor. For example, for a tolerance factor of 2, the media guidance application may compute the upper limit for the coordinates (5,10) to be (10,20). The media guidance application may then compute a lower limit based on dividing the coordinates of the first pixel position by the tolerance factor. For example, for a tolerance factor of 2, the media guidance application may compute the lower limit for the coordinates (5,10) to be (2.5,5).

The media guidance application may retrieve a second pixel position of one of a second plurality of pixels from a second table containing relative positions and properties of pixels for the first object. For example, as described above for the feature, the media guidance application may retrieve the coordinates of the second pixel position from the second table. For instance, the media guidance application may retrieve (4,7) as the relative coordinates of a pixel in the (x,y) plane. The media guidance application may then compare coordinates of the second pixel position to a range of coordinates of the first pixel position defined by the lower limit to the upper limit. For example, the media guidance application may compare the range of the first pixel position coordinates defined based on the lower and upper limits (2.5-10,5-20) to the second pixel coordinates (4,7).

The media guidance application may then determine the first pixel position matches the second pixel position when the coordinates of the second pixel position is within the range of coordinates of the first pixel position. For example, since 4 falls between 2.5 and 10 and 7 falls between 5 and 20, the media guidance application may determine that the first pixel matches the second pixel. The media guidance application, in response to determining a predetermined number of the pixel positions corresponding to the first plurality of pixels in the first table match one of a plurality pixel position in the second table, may determine the feature corresponds to the first object. For example, the media guidance application may store a predefined number or percentage of pixels that need to match for a feature to be determined to match an object, such as 85% of the pixels must match. For example, if a feature is defined by a table containing 100 pixels and the media guidance application determined 90 of the 100 pixels match an object also containing 100 pixels, the media guidance application may determine that the feature matches the object since greater than the predefined percentage of pixels were matched.

In some aspects, the media guidance application may retrieve, from a context field of a data structure associated with the first object, a context indicator associated with the first object. For example, the media guidance application may store in the data structure associated with the arrow object context indicators such as "$1^{st}+10$" or "$3^{rd}+Goal$," which indicate the context of the arrow in the football game.

In some embodiments, the media guidance application may determine, from data associated with the feature, a characteristic of the first object. For example, the media guidance application may determine that the frame containing the object additionally contains a characteristic either of the object itself or related to the object. For instance, the arrow object detected during a football game may be different colors in different situations or the frame may contain text directly indicating the context. The media guidance application may then compare the characteristic to characteristics of a plurality of context indicators stored in the data structure associated with the first object to identify a first context indicator that corresponds to the characteristic. For example, the media guidance application may compare the color of the arrow to colors of the arrow object corresponding to different context indicators. The media guidance application may then retrieve the first context indicator from the context field of the data structure associated with the first object. For example, upon comparing a red arrow that was detected to color characteristics of the arrow object corresponding to different context indicators, the media guidance application may determine the red arrow corresponds to a context indicator "$4^{th}$ down."

In some embodiments, the media guidance application may store the first context indicator, wherein progress towards a goal in a sporting event being close to the goal is stored as a characteristic of the first context indicator. For example, the media guidance application may store that when the characteristic, "$1^{st}+Goal$" is detected, the progress of a team is close to the goal. The media guidance application may also store a second context indicator, wherein progress towards the goal in the sporting event being far from the goal is stored as a characteristic of the second context indicator. For example, the media guidance application may store that when the characteristic, "$4^{th}+30$" is detected, the progress of a team is not close to the goal.

In some aspects, the media guidance application may retrieve from a database of actions corresponding to context indicators an action corresponding to the context indicator associated with the first object. For example, upon determining the context indicator that applies to the currently detected object, the media guidance application may access a database of actions and determine which action corresponds to the context indicator. For instance, if the media guidance application retrieved a context indicator for the arrow in the football game of "$4^{th}+30$," the corresponding stored action may instruct the media guidance application to skip forward to a different playback point since "$4^{th}+30$" likely results in punting in a football game, which is a context that may be boring to the viewer.

In some aspects, the media guidance application may perform the action corresponding to the context indicator associated with the first object. For example, upon retrieving that the action associated with "$4^{th}+30$" is to skip forward to a different playback point, the media guidance application may skip forward to a different playback point.

In some embodiments, the media guidance application may determine the action associated with the context indicator relates to moving a current playback position to another playback position that includes the object. For example, the media guidance application may determine that the action associated with a "$1^{st}+10$" arrow appear at a specific frame is to move from the current playback position to the playback position of the frame containing the arrow. The media guidance application may determine the another playback position based on the at least one frame containing the object. For example, the media guidance application may determine the position of the first of the at least one frame relative to other frames of the media asset and determine the another playback position. For instance, the media guidance application may determine that the first frame of the at least one frame corresponds to a playback position of 10 minutes into the media asset.

The media guidance application may move the current playback position to the another playback position. For example, the media guidance application may move the playback position from the current playback position, such as 7 minutes into the media asset, to the another playback position, 10 minutes into the media asset. The media guidance application may then play the media asset from the another playback position. For example, the media guidance application may play the media asset from the 10 minute mark corresponding to the frame where the object was detected.

In some embodiments, the media guidance application may determine the action associated with the context indicator relates to alerting a user to a media asset listing with subject matter that corresponds to the first object. For example, the media guidance application may determine that a context indicator for "Score Alert: ABC has scored" displayed in the first media asset is associated with the action to alert the user to a media asset associated with the object, such as a currently airing game of team ABC. The media guidance application may retrieve subject matter of the first object from a subject matter field of the data structure associated with the first object. For example, the media guidance application may retrieve that the subject matter relating to the "Score Alert" object with a context indicator of "ABC has scored" is any program relating to team "ABC."

The media guidance application may search for a first media asset listing associated with the retrieved subject matter. For example, the media guidance application may search a plurality of media asset listings in an electronic program guide to determine a media asset listing referring to team "ABC." The media guidance application may promote the first media asset listing among a plurality of displayed media asset listings. For example, the media guidance application may reorder the media asset listings such that a "recommended" section at the top of listings in a program guide displays a program relating to team "ABC."

In some embodiments, the media guidance application may determine the action associated with the context indicator relates to presenting supplemental information related to the object. For example, the media guidance application may determine that the object, "Score Alert: ABC" with a context indicator "+7 points" relates to presenting supplemental information, such as an overlay with a video highlight of the play that led to the scoring of points. The media guidance application may retrieve a pointer to a location of supplemental information related to the object from a supplemental information field of the data structure associated with the object. For example, the media guidance application may access the data structure of the "Score Alert: ABC" object and retrieve a pointer that points to a media content source containing a video highlight of the play.

The media guidance application may access the location of the supplemental information. For example, the media guidance application may access the media content source where the video highlight is stored via communications circuitry. The media guidance application may retrieve the supplemental information. For example, the media guidance application may retrieve the video highlight. The media guidance application may generate a simultaneous display of the media asset and the supplemental information. For example, the media guidance application may generate the video highlight over a section of the media asset.

In some embodiments, the media guidance application may determine the action is associated with presenting a first media asset to the user simultaneously with a second media asset currently being accessed by the user. For example, the media guidance application may present a football game as an overlay on the program the user is currently accessing. The media guidance application may determine the user is not accessing the first media asset. For example, the media guidance application may determine that the user is currently viewing a news program. The media guidance application may retrieve the first media asset. For example, the media guidance application may retrieve the football game. The media guidance application may generate a simultaneous display of the first media asset and the second media asset currently being accessed by the user. For example, the media guidance application may generate for display the football game overlaid on a portion of the news program. In some embodiments, the media guidance application performs a method for transmitting a portion of a media asset containing an object to a first user. For example, the media guidance application may transmit a portion of a football program containing an object indicating a touchdown was scored to the first user on a mobile device.

In some aspects in order to transmit a portion of a media asset containing an object to a first user, a media guidance application may store a plurality of objects. For example, the media guidance application may maintain a database stored in memory of objects containing information about media assets they commonly apply to, contexts where the objects appear, and properties of the objects.

In some embodiments in order to transmit a portion of a media asset containing an object to a first user, the media guidance application may create the feature. For example, either automatically by the media guidance application or by a user, the media guidance application may receive a selection of a particular feature, such as a "Score Alert" box. The media guidance application may then associate the created feature with a plurality of media assets, where the plurality of media assets contain similar content. For example, if the media guidance application determines that the "Score Alert" is commonly displayed in football and hockey games, it may associate the arrow object with sporting events. The media guidance application may then store the created feature as the first object in a library of objects associated with the plurality of media assets. For example, the media guidance application may store the properties associated with the "Score Alert" feature in an "Score Alert" object in a library containing other objects associated with sporting events. The media guidance application may then generate an overlay with the first object on the media asset. For example, upon receiving an indication, such as a signal in a data packet of a media asset stream, the media guidance application may overlay the "Score Alert" object on the media asset.

In some aspects in order to transmit a portion of a media asset containing an object to a first user, the media guidance application receives at least one frame of the media asset. For example, the media guidance application may record an entire football game and examine each of the frames of the game for an object. Alternatively, the media guidance application may examine the frames in live programming for objects as the frames are received. Alternatively, the media guidance application may store a buffer of live programming such that a number of frames before the currently displayed frame, after the currently displayed frame, or both, are analyzed to determine if any of the frames contain objects.

In some aspects in order to transmit a portion of a media asset containing an object to a first user, the media guidance application may determine a feature in the at least one frame of the media asset. For example, the media guidance application may determine that an "Score Alert" feature is present in the at least one frame.

In some embodiments in order to transmit a portion of a media asset containing an object to a first user, the media guidance application may analyze a pixel map associated with the at least one frame of the media asset. For example, the media guidance application may define a pixel map for a frame in the media asset, where each pixel in the frame has a distinct position. The media guidance application may then analyze a group of pixels in the pixel map. For example, the media guidance application may iteratively compare one pixel to other nearby pixels in the pixel map and determine that the at least one frame contains the "Score Alert" feature.

The media guidance application may then determine shared properties of a subset of pixels in the group of pixels, in order to transmit a portion of a media asset containing an object to a first user. For example, the media guidance application may determine that the pixels in a certain group of pixels in the "Score Alert" feature are arranged to form the letters, "Score Alert." The media guidance application may generate a table for the feature containing relative positions and properties of pixels in the subset of pixels. For example, the media guidance application may store the relative positions of the "Score Alert" feature, defined by the subset of pixels, as coordinates as well as any additional properties, such as color and brightness, in a table or other data structure.

In some aspects in order to transmit a portion of a media asset containing an object to a first user, the media guidance application may compare the feature to each of the stored plurality of objects to identify a first object of the stored plurality of objects that corresponds to the feature. For example, in response to determining that the at least one frame contains the arrow feature, the media guidance application may compare the properties of the "Score Alert" feature with the properties of objects stored in memory. The media guidance application may compare the feature to objects based on the genre, channel, or other commonalities of media assets for which the media guidance application has defined a library of objects.

In some embodiments in order to transmit a portion of a media asset containing an object to a first user, the media guidance application defines the feature by a first table containing relative positions and properties of a first plurality of pixels. For example, the media guidance application may store coordinates and properties for every pixel in separate rows of a table. The media guidance application may store a tolerance factor. The tolerance factor may define how closely the properties of the feature detected need to match the properties of the object stored in the database in order for a match to be returned. For example, the media guidance application may store a tolerance factor of 1, which may mean the properties must match exactly. Alternatively, the media guidance application may store a tolerance factor of 30, which may mean the properties do not need to be very close to return a match.

The media guidance application may then access a first pixel position of a first pixel stored in the first table, in order to transmit a portion of a media asset containing an object to a first user. For example, the media guidance application may retrieve the coordinates of the first pixel position from the first table. For instance, the media guidance application may retrieve (5,10) as the relative coordinates of a first pixel in the (x,y) plane. The media guidance application may then compute an upper limit based on multiplying coordinates of the first pixel position by the tolerance factor. For example, for a tolerance factor of 2, the media guidance application may compute the upper limit for the coordinates (5,10) to be (10,20). The media guidance application may then compute a lower limit based on dividing the coordinates of the first pixel position by the tolerance factor. For example, for a tolerance factor of 2, the media guidance application may compute the lower limit for the coordinates (5,10) to be (2.5,5).

The media guidance application may retrieve a second pixel position of one of a second plurality of pixels from a second table containing relative positions and properties of pixels for the first object, in order to transmit a portion of a media asset containing an object to a first user. For example, as described above for the feature, the media guidance application may retrieve the coordinates of the second pixel position from the second table. For instance, the media guidance application may retrieve (4,7) as the relative coordinates of a pixel in the (x,y) plane. The media guidance application may then compare coordinates of the second pixel position to a range of coordinates of the first pixel position defined by the lower limit to the upper limit. For example, the media guidance application may compare the range of the first pixel position coordinates defined based on the lower and upper limits (2.5-10,5-20) to the second pixel coordinates (4,7).

The media guidance application may then determine the first pixel position matches the second pixel position when the coordinates of the second pixel position is within the range of coordinates of the first pixel position. For example, since 4 falls between 2.5 and 10 and 7 falls between 5 and 20, the media guidance application may determine that the first pixel matches the second pixel. The media guidance application, in response to determining a predetermined number of the pixel positions corresponding to the first plurality of pixels in the first table match one of a plurality pixel position in the second table, may determine the feature corresponds to the first object. For example, the media guidance application may store a predefined number or percentage of pixels that need to match for a feature to be determined to match an object, such as 85% of the pixels must match. For example, if a feature is defined by a table containing 100 pixels and the media guidance application determined 90 of the 100 pixels match an object also containing 100 pixels, the media guidance application may determine that the feature matches the object since greater than the predefined percentage of pixels were matched, in order to transmit a portion of a media asset containing an object to a first user.

In some aspects, the media guidance application may determine the first user is not accessing the media asset. For example, the media guidance application may determine that all of the user equipment devices associated with the first user are either powered down or tuned to a different media asset.

In some embodiments, the media guidance application may retrieve an identifier of a first user equipment device of a plurality of user equipment devices associated with the first user from the data structure containing the user profile associated with the first user. For example, the media guidance application may query the data structure containing the user profile of the first user and determine there are two set-top boxes connected to televisions associated with the user's account. Further, the media guidance application may then retrieve an identifier of one of the set-top boxes. The media guidance application may access a status of the first user equipment device. For example, the media guidance application may transmit a message to the set-top box to query the status of tuners contained in the set-top box. The media guidance application may determine, from the status, the first user equipment device is not accessing the media asset. For example, the media guidance application may determine that since each tuner of a set-top box is tuned to a different program, the set-top box is not accessing the media asset.

The media guidance application may, in response to determining each of the plurality of user equipment devices associated with the first user is not accessing the media asset, determine the first user is not accessing the media asset. For example, if the media guidance application determines that each of the user equipment devices is not receiving the media asset, the media guidance application may determine that the first user is not accessing the first media asset.

In some aspects, the media guidance application may, in response to determining the feature corresponds to the first object and the first user is not accessing the media asset, store data corresponding to the at least one frame containing the object in memory. For example, the media guidance application may store a screenshot of the at least one frame containing the object. As another example, the media guidance application may store a portion of the media asset containing the object. As another example, the media guidance application may store a detailed description or media asset listing associated with the object.

In some embodiments, the media guidance application may determine a first playback point in the media asset based on a first frame of the at least one frame containing the object. For example, the media guidance application may determine the position of the first of the at least one frame relative to other frames of the media asset and determine the first playback point. For instance, the media guidance application may determine that the first frame of the at least one frame corresponds to a playback point of 10 minutes into the media asset. The media guidance application may store, from the first playback point, the portion of the media asset in memory. For example, the media guidance application may store frames of the media asset subsequent to the first frame in memory. The media guidance application may determine a second playback point in the media asset based on a second frame wherein the second frame does not contain the object. For example, the media guidance application may determine the position of the second frame relative to other frames of the media asset and determine the second playback point. For instance, the media guidance application may determine that the second frame corresponds to a playback point of 15 minutes into the media asset. The media guidance application may cease the storing of the portion of the media asset in memory at the second playback point.

In some embodiments, the media guidance application may determine, from an information field of a data structure associated with the object, a pointer to a location of the information describing the media asset. For example, the media guidance application may access the data structure of a "New team ABC" object and retrieve a pointer that points to a media content source containing a video highlight of the team ABC.

The media guidance application may access the location of the information describing the media asset. For example, the media guidance application may access the media content source where the video highlight is stored via communications circuitry. The media guidance application may retrieve the information describing the media asset. For example, the media guidance application may retrieve the video highlight.

The media guidance application may store the information describing the media asset in memory. For example, the media guidance application may store, in a data structure in a user profile associated with the first user, the video highlight.

In some aspects, the media guidance application may retrieve an identifier of a mobile device of the first user from a data structure containing a user profile associated with the first user. For example, the media guidance application may retrieve an identifier of a mobile phone, such as telephone number of the mobile phone, associated with the first user.

In some embodiments, the media guidance application may access the data structure containing the user profile associated with the first user. The media guidance application may then query the data structure to determine if any mobile devices are associated with the first user. The media guidance application may then, in response to determining the first mobile device is associated with the first user, retrieve the identifier of the first mobile device associated with the first user. For example, the media guidance application may retrieve a telephone number corresponding to a mobile phone associated with the first user.

In some aspects, the media guidance application may transmit, to the mobile device associated with the first user, the stored data corresponding to the at least one frame containing the object. For example, the media guidance application may transmit a text message to the first user's mobile phone containing the stored data, or alternatively, a link to the stored data.

In some embodiments, the media guidance application may determine the first mobile device has not received the transmitted stored data. For example, the media guidance application may request a receipt of transmission from the first mobile device. After not receiving an indication the transmission was successful in a threshold period of time, the media guidance application may determine the first mobile device has not received the stored data.

The media guidance application may query the data structure containing the user profile associated with the first user for a second mobile device associated with the first user. For example, the media guidance application may query the data structure and determine a second mobile phone is associated with the first user. The media guidance application may then retrieve an identifier, such as a telephone number, of a second mobile phone associated with the first user. The media guidance application may, in response to determining the second mobile device associated with the first user, transmit the stored data corresponding to the at least one frame containing the object to the second mobile device. For example, the media guidance application may transmit the stored data to the second mobile phone associated with the first user.

In some embodiments, in response to the mobile device receiving the transmission of the stored data, the media guidance application may generate for display on the mobile device an identifier of the media asset. For example, the media guidance application may generate for display an identifier of the media asset, such as "Football Game," corresponding to an object stored in the database containing a plurality of objects.

The media guidance application may generate for display on the mobile device a selectable option to access the stored data. For example, the media guidance application may generate for display an option to open the received stored data. In response to the first user selecting the option to access the stored data, the media guidance application may generate for display the stored data on the mobile device. For example, the media guidance application may generate for display a portion of the media asset containing the object.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 4 shows an illustrative depiction of a database containing actions corresponding to context indicators in accordance with some embodiments of the disclosure;

DETAILED DESCRIPTION

Systems and methods are provided herein for performing an action based on a feature in a media asset. In many media assets, specific features appear at portions of a program that users find interesting. These features can be compared with a database of stored objects that commonly appear in media assets to determine an appropriate action for the system to take.

In some instances, context of the object may be needed to determine an appropriate action. For example, directly before the beginning of every play in a football game, an arrow is displayed. However, just because a play is about to occur does not mean the user would find the play interesting. Instead, the arrow has to be given context with respect to the football game. For example, if text displayed with the arrow indicates, "1$^{st}$+Goal," the play may be more interesting to the user than other plays, since there is an imminent possibility of scoring points, and may have a different action associated with it. The system may perform a specific action once an object is detected, such as skipping to the playback point where the object appears, or transmitting data related to the media asset to a mobile device if the user is not currently accessing the media asset.

As referred to herein, a "media guidance application," or an "interactive media guidance application" or, sometimes, a "media guidance application" or a "guidance application" is an application that allows a user to consume, and/or navigate to, media assets. In some embodiments, the media guidance application may be provided as an online application (i.e., provided on a website), or as a stand-alone application on a server, user device, etc. In some embodiments, control circuitry installed on various devices and platforms may execute the media guidance application, as described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

Figure 1:
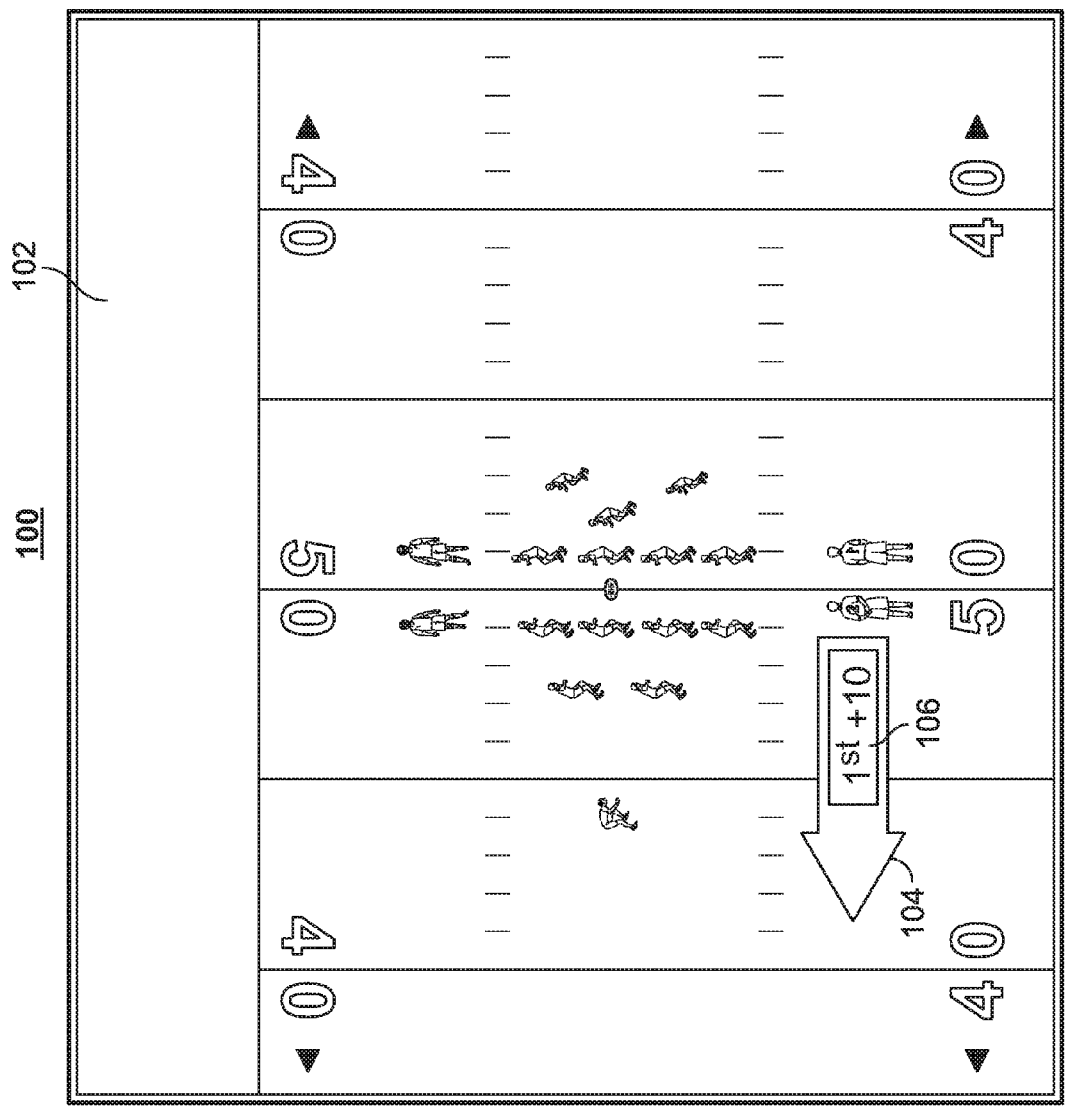
FIG. 1 shows an illustrative display of a media guidance application displaying a media asset with an object in accordance with some embodiments of the disclosure.

FIG. 1 shows an illustrative display of a media guidance application displaying a media asset with an object in accordance with some embodiments of the disclosure. For example, display 100 may be presenting a media guidance application displaying media asset 102. Display 100 may appear on one or more user devices (e.g., any of the devices listed in FIGS. 12-13 below). Moreover, the media guidance application may use one or more of the processes described in FIGS. 14-24 below to generate display 100 or any of the features described therein.

FIG. 1 includes display 100. Display 100 may appear on a display device (e.g., user equipment devices 1302, 1304, and/or 1306 (FIG. 13) below). Furthermore, control circuitry 1204, as described below in relation to FIG. 12, may be used to generate a display 100. Display 100 includes media asset 102 presented by the media guidance application which includes arrow 104. For example, the media guidance application may receive a request by the first user (e.g., via user input interface 1210) to view media asset 102.

In some aspects, the media guidance application receives at least one frame of media asset 102. For example, the media guidance application may record an entire football game in memory (e.g., storage as described in FIG. 12 below) and examine each of the frames of the game for an object. Alternatively, the media guidance application may examine the frames in live programming for objects as the frames are received. For example, the media guidance application may examine each frame as it is presented on display 100 for objects. Alternatively, the media guidance application may store a buffer of live programming such that a number of frames before the currently displayed frame, after the currently displayed frame, or both, are analyzed to determine if any of the frames contain objects. For example, the media guidance application may maintain a buffer of ten frames in memory (e.g., storage as described in FIG. 12 below), such that display 100 displays the eleventh most recently received frame and the ten more recently received frames are analyzed by the media guidance application for objects.

In some aspects, the media guidance application may determine a feature in the at least one frame of the media asset. For example, the media guidance application may determine that an arrow feature 104 is present in the at least one frame of media asset 102. In some embodiments, the media guidance application may determine the feature by examining the patterns of particular subsets of pixels in the at least one frame of media asset 102, as described further in FIG. 2-3 below. In other embodiments, the media guidance application may determine the feature by analyzing patterns in the waveform of an audio track. For example, the media guidance application may determine that the appearance of particular frequencies that appear in a repeated pattern in media asset 102 corresponds to a feature.

In some aspects, a media guidance application may store a plurality of objects. For example, the media guidance application may maintain a database stored in memory (e.g., storage as described in FIG. 12 below) of objects containing information about media assets they commonly apply to, contexts where the objects appear, and properties of the objects. For example, the media guidance application may organize the objects into a table where each column describes properties of an object, as described in FIG. 3 below.

In some aspects, the media guidance application may compare the feature to each of the stored plurality of objects to identify a first object of the stored plurality of objects that corresponds to the feature. For example, in response to determining that the at least one frame contains arrow feature 104, the media guidance application may compare the properties of arrow feature 104 with the properties of objects stored in memory (e.g., storage as described in FIG. 12 below). The media guidance application may compare the feature to objects based on the genre, channel, or other commonalities of media assets for which the media guidance application has defined a library of objects, as described further in FIG. 2-3. The media guidance application may then determine that arrow feature 104 corresponds to the arrow object stored in memory.

In some aspects, the media guidance application may retrieve, from a context field of a data structure associated with the first object, a context indicator associated with the first object. For example, the media guidance application may store in the data structure associated with the arrow object context indicators such as "$1^{st}+10$" or "$3^{rd}$ and Goal," which indicate the context of the arrow in the football game.

Specifically, the media guidance application associates different context indicators with each object so that an action may be taken by the media guidance application specific to the context of the object. For example, the media guidance application may determine that the context indicator 106 that applies to arrow 104 is "$1^{st}+10$," based on an additional characteristic in the at least one frame of media asset 102 containing arrow 104, which may be determined as described in FIG. 2-3. The media guidance application can thus differentiate the "$1^{st}+10$" play from the "$3^{rd}$ and Goal" play and perform an action appropriate for each situation.

In some aspects, the media guidance application may retrieve from a database of actions corresponding to context indicators an action corresponding to the context indicator associated with the first object. For example, upon determining the context indicator 106 that applies to the currently detected object, the media guidance application may access a database of actions and determine which action corresponds to the context indicator, as described further in FIG. 4 below. For instance, the media guidance application retrieved a context indicator for the arrow 104 in media asset 102 of "$1^{st}+10$," the corresponding stored action may instruct the media guidance application to skip to this point in a recording once it is detected, since "$1^{st}+10$" represents the beginning of a set of downs in a football game, which likely corresponds to action the user will find entertaining. Alternatively, if the media guidance application retrieved a context indicator for the arrow in the football game of "$4^{th}+30$," the corresponding stored action may instruct the media guidance application to skip forward to a different playback point since "$4^{th}+30$" likely results in punting in a football game, which is a context that may be boring to the viewer.

In some aspects, the media guidance application may perform the action corresponding to the context indicator associated with the first object. For example, upon retrieving that the action associated with "$1^{st}+10$" is to move to that playback point, the media guidance application may move to the playback point of the arrow 104 with context indicator 106, "$1^{st}+10$." In some embodiments, the media guidance application may perform the action automatically without further input from the user. For example, as the user is viewing a recording of a football game, such as media asset 102, the media guidance application may automatically skip to the frame shown in FIG. 1 containing object 104 without further user input. In other embodiments, the media guidance application may perform the action upon receiving a user input. For example, if the media guidance application receives a user input of a "skip forward" option, the media guidance application may skip forward to the frame shown in FIG. 1 containing the object, instead of skipping forward based on time alone (e.g., skipping 30 seconds forward in time).

Figure 2:
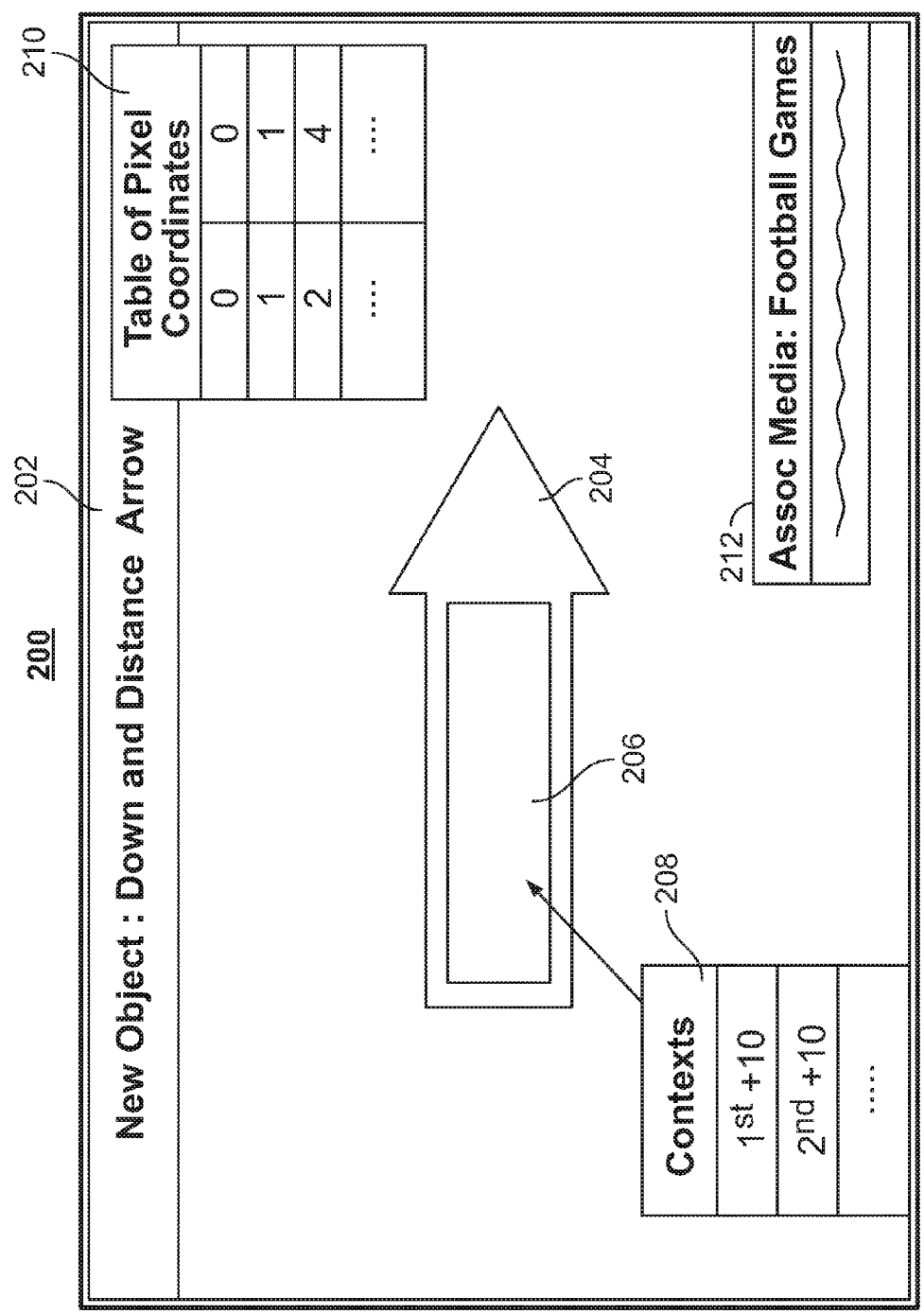
FIG. 2 shows another illustrative display of a media guidance application displaying an object being created in accordance with some embodiments of the disclosure.

FIG. 2 shows another illustrative display of a media guidance application displaying an object being created in accordance with some embodiments of the disclosure. For example, display 200 may be presenting a media guidance application displaying a plurality of options for creating a new object, such as "Down and Distance Arrow" 202. Display 200 may appear on one or more user devices (e.g., any of the devices listed in FIGS. 12-13 below). Moreover, the media guidance application may use one or more of the processes described in FIGS. 14-24 below to generate display 100 or any of the features described therein.

FIG. 2 includes display 200. Display 200 may appear on a display device (e.g., user equipment devices 1302, 1304, and/or 1306 (FIG. 13) below). Furthermore, control circuitry 1204, as described below in relation to FIG. 12, may be used to generate a display 200. Display 200 includes an indication of the object being created, "Down and Distance Arrow" 202. The media guidance application may store a plurality of objects created in the same manner as "Down and Distance Arrow" 202. For example, the media guidance application may maintain a database stored in memory of objects containing information about media assets they commonly apply to, contexts where the objects appear, and properties of the objects, as described below.

The media guidance application may create the object "Down and Distance Arrow" 202. For example, the media guidance application may receive a user input (e.g., via a user input interface as described in FIG. 12) a selection of a particular feature, such as arrow 204. For instance, the media guidance application may receive the user input as a traced image from a frame of a media asset to define feature 204. Alternatively, the user may draw feature 204 without reference to a frame from a media asset. Alternatively, the media guidance application may determine that a feature, defined by characteristics of the pixels in frames of the media asset, is common to a plurality of media assets and create feature 204 without further user input.

The media guidance application may receive a selection of a portion of the feature 204 that may contain context indicator 206. For example, the media guidance application may receive a user selection of a rectangular box where text describing the feature generally appears, (i.e., that gives the object context such as "1$^{st}$+10" which defines the specific down and distance for a play in a football game). The text describing the feature may be stored in a context table 208, where a plurality of possible contexts are listed which may appear as the context indicator 206 in feature 204.

The media guidance application may, based on created feature 204, define pixel coordinates 210 which can be used by the media guidance application to define feature 204. For example, the media guidance application may define for each pixel a relative position in (x,y) coordinate space for the pixel. This allows the media guidance application to compare a feature detected in a media asset to objects stored in memory, as described further in FIG. 3.

The media guidance application may then associate the created feature with a plurality of media assets, where each of the plurality of media assets contains similar content. For example, if the media guidance application determines that arrow 204 is commonly displayed in football related media assets, it may associate the arrow object with football games 212.

The media guidance application may then store the created feature 204 as the first object 202 in a library of objects associated with the plurality of media assets. For example, the media guidance application may store the properties associated with arrow feature 204 in an arrow object 202 in a library containing other objects associated with sporting events. The media guidance application may then generate an overlay with the first object on the media asset. For example, upon receiving an indication, such as a signal in a data packet of a media asset stream, the media guidance application may overlay the arrow object 202 on the media asset.

The media guidance application may determine a feature in the at least one frame of the media asset. For example, the media guidance application may determine that an arrow feature is present by examining pixels in the at least one frame and determining context indicator 206 and feature 204 in a similar manner to that described above for creating new object 202. Once the media guidance application has mapped the feature and a table of pixel coordinates 210 has been created for the feature, it may be compared to objects stored in memory.

The media guidance application may analyze a pixel map associated with the at least one frame of the media asset. For example, the media guidance application may define a pixel map for a frame in the media asset, where each pixel in the frame has a distinct position (e.g., table of pixel coordinates 210). The media guidance application may then analyze a group of pixels in the pixel map. For example, the media guidance application may iteratively compare one pixel to other nearby pixels in the pixel map.

The media guidance application may then determine shared properties of a subset of pixels in the group of pixels. For example, the media guidance application may determine that every pixel in a particular horizontal line has similar properties. The media guidance application may generate a table (e.g., table of pixel coordinates 210) for the feature containing relative positions and properties of pixels in the subset of pixels. For example, the media guidance application may store the relative positions of a horizontal line feature, defined by the subset of pixels, as coordinates as well as any additional properties, such as color and brightness, in a table or other data structure. The media guidance application may then compare the detected feature to the objects easily, since both the detected feature and the created objects have a table of pixel coordinates (e.g., table 210) associated with them.

Figure 3:
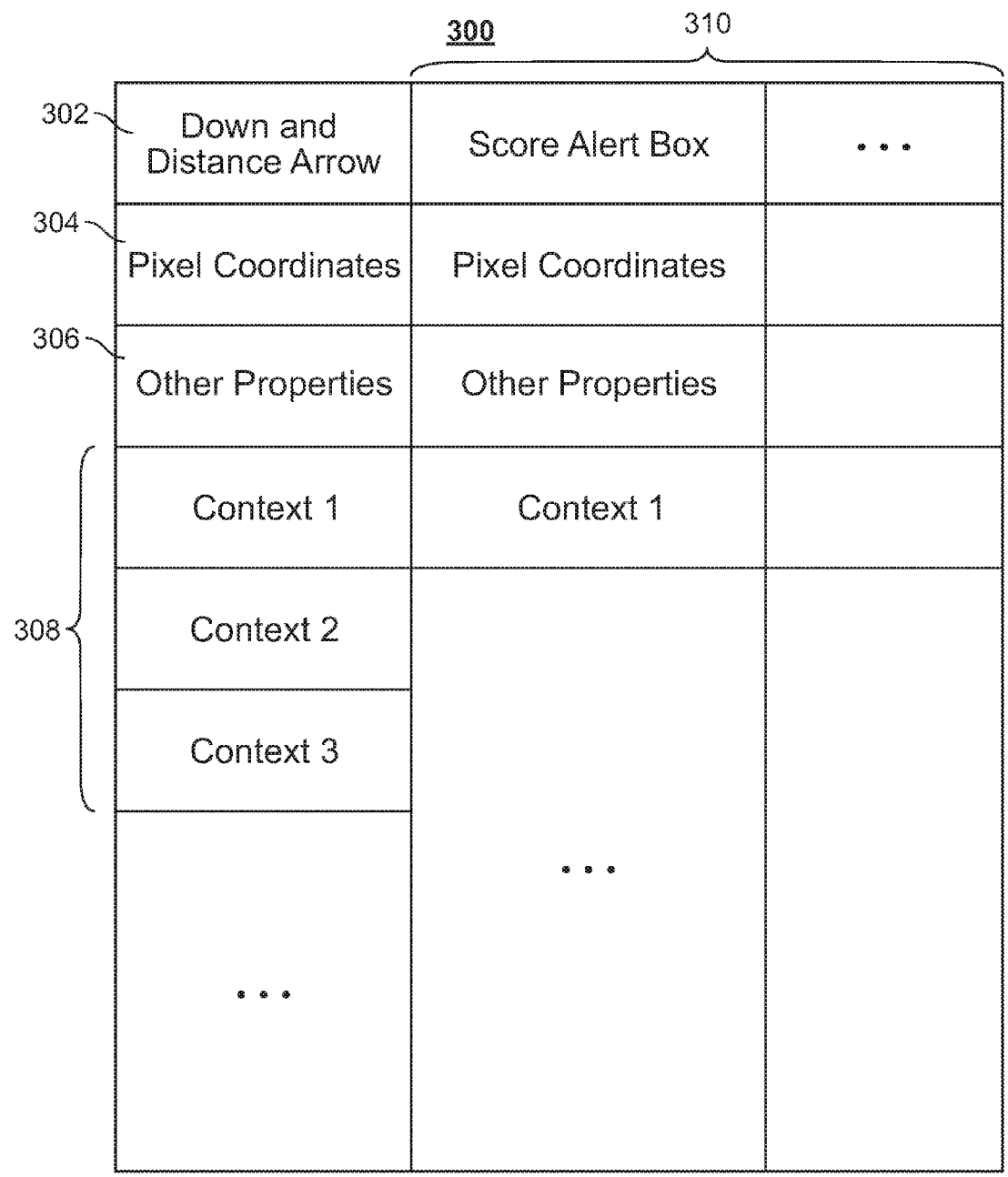
FIG. 3 shows an illustrative depiction of a database containing objects in accordance with some embodiments of the disclosure.

FIG. 3 shows an illustrative depiction of a database containing objects in accordance with some embodiments of the disclosure. For example, database 300 may be organized such that each column corresponds to a particular object, and properties relating to each object are contained in rows below. Database 300 may be stored in memory (e.g., storage as described in FIG. 12) on one or more user devices (e.g., any of the devices listed in FIGS. 12-13 below). Moreover, the media guidance application may use one or more of the processes described in FIGS. 14-24 below to generate database 300 or any of the features described therein.

FIG. 3 includes database 300. Database 300 may be stored in memory (e.g., storage as described in FIG. 12) on a display device (e.g., user equipment devices 1302, 1304, and/or 1306 (FIG. 13) below). Furthermore, control circuitry 1204, as described below in relation to FIG. 12, may be used to generate database 300 and populate it with values. Database 300 includes an identifier of object 302, "Down and Distance Arrow," as well as a plurality of identifiers of additional objects 310 in subsequent columns of the table. Each object has a plurality of properties (e.g., pixel coordinates field 304, other properties 306, and contexts 308) associated with the object.

The media guidance application may store pixel coordinates 304 for an object. In some embodiments, the media guidance application defines the feature or features representative of object 302 by a first table containing relative positions and properties of a first plurality of pixels (e.g., as described in FIG. 2). The media guidance application may store in pixel coordinates field 304 of object 302 a pointer to a table containing the pixel coordinates for object 302, or the field may contain a two-dimensional array, list, or other data structure appropriate for containing the (x,y) plane relative pixel coordinates. For example, the media guidance application may store coordinates and properties for every pixel in separate rows of a table (e.g., as described in FIG. 2).

The media guidance application may store a tolerance factor. The tolerance factor may define how closely the properties of the feature detected need to match the properties of object 302 stored in database 300 in order for a match to be returned. For example, the media guidance application may store a tolerance factor of 1, which may mean the properties must match exactly. Alternatively, the media guidance application may store a tolerance factor of 30, which may mean the properties do not need to be very close to return a match.

The media guidance application may then access a first pixel position of a first pixel stored in the first table containing the pixel coordinates of the detected feature. For example, the media guidance application may retrieve the coordinates of the first pixel position from the first table by executing a database query language script, such as SQL, utilizing the declarative "Select" command to access data in a particular table or expression. For instance, the media guidance application may retrieve (5,10) as the relative coordinates of a first pixel in the (x,y) plane. The media guidance application may then compute an upper limit based on multiplying coordinates of the first pixel position by the tolerance factor. For example, for a tolerance factor of 2, the media guidance application may compute the upper limit for the coordinates (5,10) to be (10,20). The media guidance application may then compute a lower limit based on dividing the coordinates of the first pixel position by the tolerance factor. For example, for a tolerance factor of 2, the media guidance application may compute the lower limit for the coordinates (5,10) to be (2.5,5).

The media guidance application may retrieve a second pixel position of one of a second plurality of pixels from a second table (e.g., either contained or pointed to by pixel coordinates field 304) containing relative positions and properties of pixels for the first object (e.g., object 302). For example, as described above for the feature, the media guidance application may retrieve the coordinates of the second pixel position from the second table (e.g., either contained or pointed to by pixel coordinates field 304). For instance, the media guidance application may retrieve (4,7) as the relative coordinates of a pixel in the (x,y) plane. The media guidance application may then compare coordinates of the second pixel position to a range of coordinates of the first pixel position defined by the lower limit to the upper limit. For example, the media guidance application may compare the range of the first pixel position coordinates defined based on the lower and upper limits (2.5-10,5-20) to the second pixel coordinates (4,7).

The media guidance application may then determine the first pixel position matches the second pixel position when the coordinates of the second pixel position is within the range of coordinates of the first pixel position. For example, since 4 falls between 2.5 and 10 and 7 falls between 5 and 20, the media guidance application may determine that the first pixel matches the second pixel.

The media guidance application, in response to determining a predetermined number of the pixel positions corresponding to the first plurality of pixels in the first table match one of a plurality pixel position in the second table, may determine the feature corresponds to the first object (e.g., object 302). For example, the media guidance application may store a predefined number or percentage of pixels that need to match for a feature to be determined to match object 302, such as 85% of the pixels must match. For example, if a feature is defined by a table containing 100 pixels and the media guidance application determined 90 of the 100 pixels match an object also containing 100 pixels, the media guidance application may determine that the feature matches object 302 since greater than the predefined percentage of pixels matched.

The media guidance application may store other properties 306 associated with objects (e.g., 302 and 310) in database 300. For instance, the tolerance factor described above may be stored in other properties 306. Alternatively or additionally, the media guidance application may store the media assets in which the object (e.g., 302 and 310) commonly appears in other properties 306. For example, the media guidance application may store that object 302 is commonly determined in sporting events, specifically football games. Alternatively or additionally, the media guidance application may store properties associated with the hue, brightness, contrast of the pixels comprising the object. For example, the media guidance application may contain either in a separate table in other properties 306 or as additional rows in pixel coordinates field 304, an indication of the color of each pixel (e.g., based on red-green-blue color numbers).

The media guidance application may store contexts 308 associated with each object (e.g., object 302 and each of objects 310) and characteristics that suggest that a particular context applies in database 300. For example, "Down and Distance Arrow" object 302 may contain a plurality of contexts. Each context provides clarity for the situation in which the object appears. For example, object 302 may appear during a plurality of distinct playback points during a football game, but the context of its appearance may not be the same each time it appears. For example, the media guidance application may store "$1^{st}+10$" and "$4^{th}+30$" as particular contexts for object 302. As an example, characteristics of "$1^{st}+10$" may include the text "$1^{st}+10$" as well as a color of the pixels spelling out the text, such as green (indicated by red-green-blue color numbers). Avid football fans will know that in most "$4^{th}+30$" situations, the team will likely be punting. Viewers may find this much less entertaining than a "$1^{st}+10$" play and as such the media guidance application may perform a different action.

In some embodiments, the media guidance application may determine, from data associated with the feature, a characteristic of the first object. For example, the media guidance application may determine that the frame containing the object additionally contains a characteristic either of the object itself or related to the object. For instance, an arrow object detected during a football game may be different colors in different situations or the frame may contain text directly indicating the context. The media guidance application may then compare the characteristic to characteristics of a plurality of context indicators stored in database 300 as a plurality of contexts 308 associated with the first object (e.g., object 302) to identify a first context indicator that corresponds to the characteristic. For example, the media guidance application may compare the color of the arrow to colors of the arrow object corresponding to different context indicators. The media guidance application may then retrieve the first context indicator from the context field of the data structure associated with the first object (e.g., the cell of the column defining object 302 containing the appropriate context). For example, upon comparing a red arrow that was detected to color characteristics of the "Down and Distance Arrow" object 302 corresponding to different context indicators, the media guidance application may determine the red arrow corresponds to a context indicator "$4^{th}$ down."

The media guidance application may store the first context indicator, wherein progress towards a goal in a sporting event being close to the goal is stored as a characteristic of the first context indicator. For example, the media guidance application may store as one of contexts 308 that when the characteristic, "$1^{st}$+Goal" is detected, the progress of a team is close to the goal. The media guidance application may also store a second context indicator as one of contexts 308, wherein progress towards the goal in the sporting event being far from the goal is stored as a characteristic of the second context indicator. For example, the media guidance application may store that when the characteristic, "$4^{th}$+30" is detected, the progress of a team is not close to the goal.

In some embodiments, the media guidance application may detect multiple objects all in the same at least one frame. In other properties 306, the media guidance application may store an indication of relative priority of each object, which may be tied to contexts 308. For example, while "$4^{th}$+30" punting situations may typically result in the media guidance application performing a certain action (e.g., skipping the play), if a second object is detected the media guidance application may perform a different action. For example, if an object "loud cheering" is detected along with object 302 with context "$4^{th}$+30," the "loud cheering" action may have priority as indicated in other properties by a priority level "1" for the "loud cheering" object and a priority level "5" for object 302 with context "$4^{th}$+30."

FIG. 4 shows an illustrative depiction of a database containing actions corresponding to context indicators in accordance with some embodiments of the disclosure. For example, database 400 may be organized such that each row corresponds to a particular context indicator 402 and an action associated with that context indicator 404. Database 400 may be stored in memory (e.g., storage as described in FIG. 12) on one or more user devices (e.g., any of the devices listed in FIGS. 12-13 below). Moreover, the media guidance application may use one or more of the processes described in FIGS. 14-24 below to generate database 400 or any of the features described therein.

FIG. 4 includes database 400. Database 400 may be stored in memory (e.g., storage as described in FIG. 12) on a user equipment device (e.g., user equipment devices 1302, 1304, and/or 1306 (FIG. 13) below). Furthermore, control circuitry 1204, as described below in relation to FIG. 12, may be used to generate database 400 and populate it with values.

The media guidance application may retrieve from database 400 of actions corresponding to context indicators an action corresponding to the context indicator associated with the first object. For example, upon retrieving the context indicator that applies to the currently detected object, as described above in FIG. 3, the media guidance application may access a database of actions and determine which action corresponds to the context indicator. For instance, if the media guidance application retrieved a context indicator for the arrow in the football game of "$4^{th}$+10," the corresponding stored action may instruct the media guidance application to skip forward to a different playback point. The instructions stored for each action 404 corresponding to context indicator 402 comprise directions to control circuitry (e.g., control circuitry 1204) to manipulate the media asset delivered to the viewer by the media guidance application in some way. The media guidance application may, for example, skip forward to a different playback point in a buffer of a media asset, as described below in FIG. 5-6.

Figure 5:
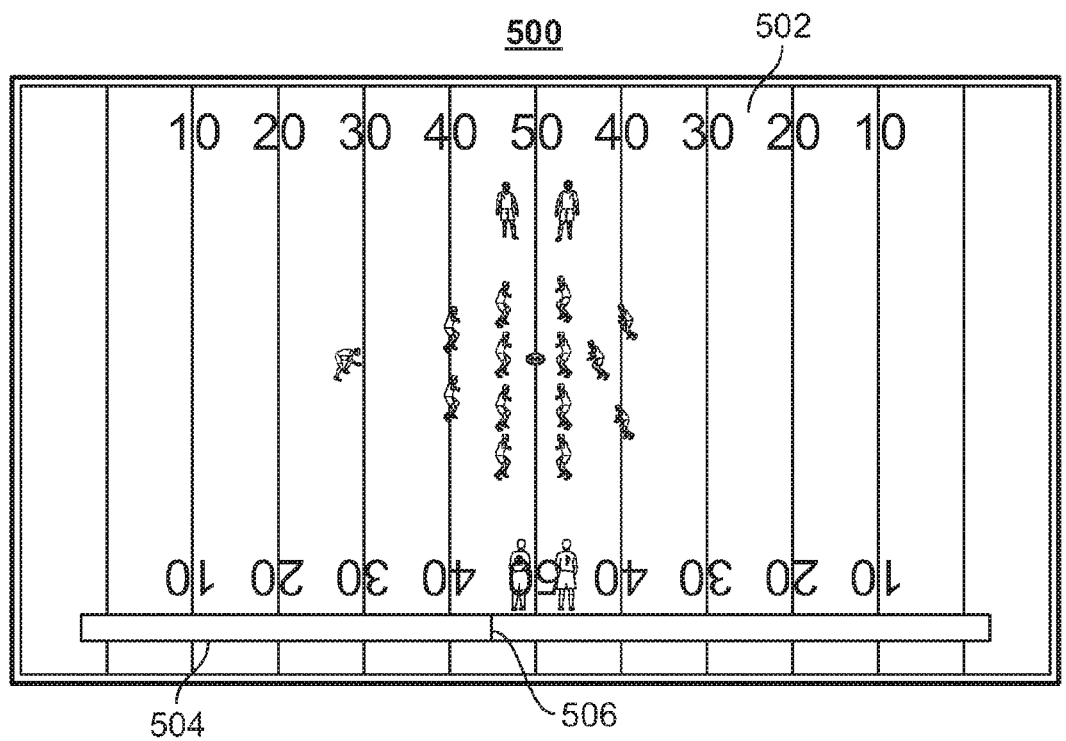
FIG. 5 shows an illustrative display of a media guidance application displaying a media asset in accordance with some embodiments of the disclosure.

FIG. 5 shows an illustrative display of a media guidance application displaying a media asset in accordance with some embodiments of the disclosure. For example, display 500 may be presenting a media guidance application displaying media asset 502. Display 500 may appear on one or more user devices (e.g., any of the devices listed in FIGS. 12-13 below). Moreover, the media guidance application may use one or more of the processes described in FIGS. 14-24 below to generate display 500 or any of the features described therein.

FIG. 5 includes display 500. Display 500 may appear on a display device (e.g., user equipment devices 1302, 1304, and/or 1306 (FIG. 13) below). Furthermore, control circuitry 1204, as described below in relation to FIG. 12, may be used to generate a display 500. Display 500 includes media asset 502 presented by the media guidance application which includes time bar 504 with playback position 506. The media guidance application detects, at a future playback position, an object in media asset 502 and moves the playback position to the playback position where the object appears, as described in FIG. 6 below.

Figure 6:
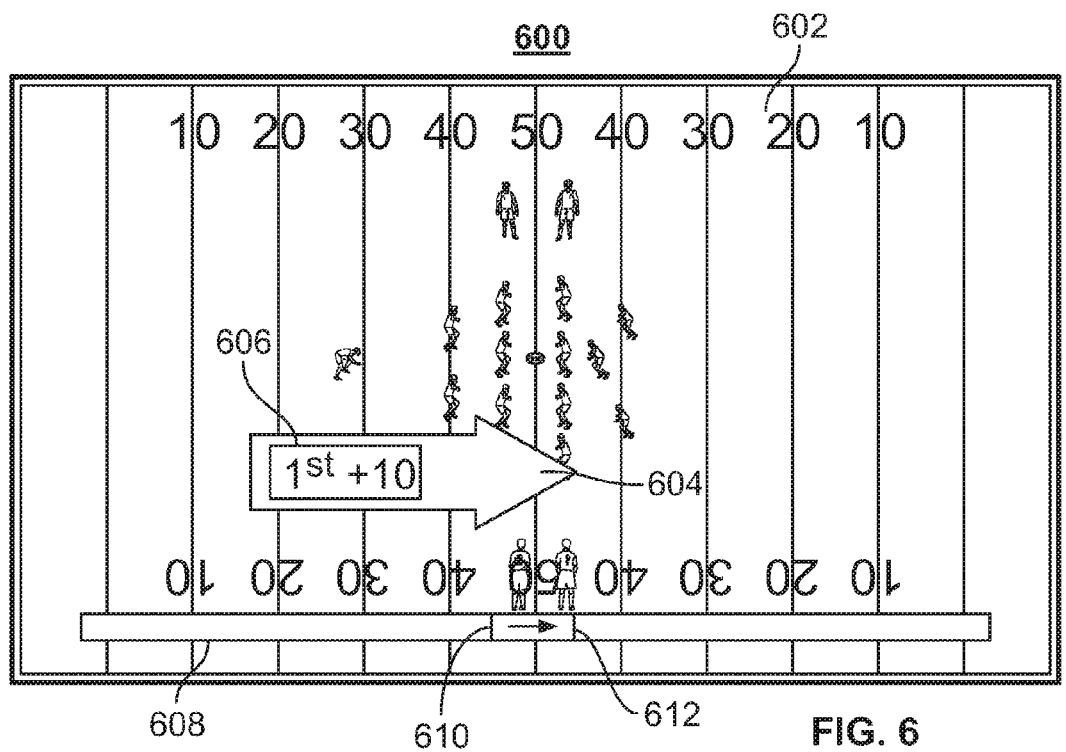
FIG. 6 shows yet another illustrative display of a media guidance application displaying an object on the media asset in accordance with some embodiments of the disclosure.

FIG. 6 shows yet another illustrative display of a media guidance application displaying an object on the media asset in accordance with some embodiments of the disclosure. For example, display 600 may be presenting a media guidance application displaying media asset 602. Media asset 602 may be the same media asset as displayed in FIG. 5, but at a different playback position. Display 600 may appear on one or more user devices (e.g., any of the devices listed in FIGS. 12-13 below). Moreover, the media guidance application may use one or more of the processes described in FIGS. 14-24 below to generate display 600 or any of the features described therein.

FIG. 6 includes display 600. Display 600 may appear on a display device (e.g., user equipment devices 1302, 1304, and/or 1306 (FIG. 13) below). Furthermore, control circuitry 1204, as described below in relation to FIG. 12, may be used to generate display 600. Display 600 includes media asset 602 presented by the media guidance application, which includes object 604 with context indicator 606. Display 600 also includes time bar 608, which visually represents the playback progress of media asset 602.

The media guidance application detects (e.g., as described in FIG. 1-2), at a future playback position, an object in media asset 602 at playback position 610 and moves the playback position to the playback position 612 where the object 604 appears.

The media guidance application may determine the action associated with the context indicator 606 (e.g., as described in FIG. 3-4) relates to moving a current playback position (e.g., playback position 610 which is the same playback position as playback position 506) to another playback position 612 that includes the object 604. For example, the media guidance application may determine that the action associated with a "1ˢᵗ+10" arrow object 604 appearing at playback position 612 is to move the current playback position 610 to the playback position 612 of the frame containing the arrow object 604. The media guidance application may determine the another playback position 612 based on the at least one frame containing the object. For example, the media guidance application may determine the position of the first of the at least one frame relative to other frames of the media asset and determine the another playback position 612. For instance, the media guidance application may determine that the first frame of the at least one frame corresponds to a playback position of 10 minutes into the media asset.

The media guidance application may move the current playback position 610 to the another playback position 612. For example, the media guidance application may move the playback position from the current playback position 610, such as 7 minutes into the media asset, to the another playback position 612, 10 minutes into the media asset. The media guidance application may transmit this request to control circuitry 1204, which may access the another playback position 612 in a buffer of media asset 602. The media guidance application may then play the media asset from the another playback position. For example, the media guidance application may generate for display media asset 602 from the 10 minute mark corresponding to the frame where the object was detected and continue playback from that position.

Figure 7:
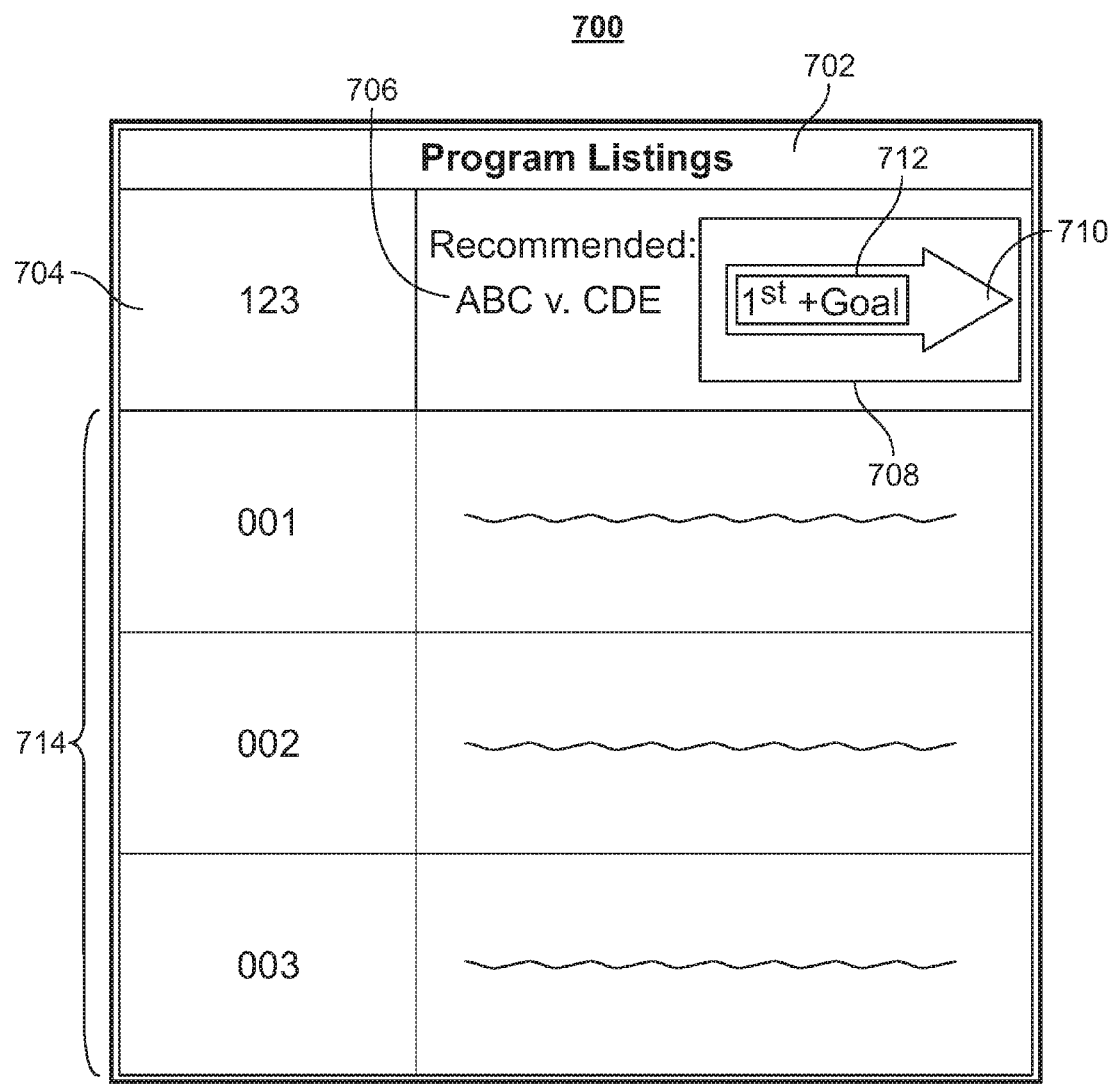
FIG. 7 shows an illustrative display of an electronic program guide in accordance with some embodiments of the disclosure.

FIG. 7 shows an illustrative display of an electronic program guide in accordance with some embodiments of the disclosure. For example, display 700 may be presenting a media guidance application displaying media asset listings 702. Display 700 may incorporate the electronic program guide features and listings described below in FIG. 10-11. Display 700 may appear on one or more user devices (e.g., any of the devices listed in FIGS. 12-13 below). Moreover, the media guidance application may use one or more of the processes described in FIGS. 14-24 below to generate display 700 or any of the features described therein.

FIG. 7 includes display 700. Display 700 may appear on a display device (e.g., user equipment devices 1302, 1304, and/or 1306 (FIG. 13) below). Furthermore, control circuitry 1204, as described below in relation to FIG. 12, may be used to generate display 700. Display 700 includes media asset listings 702 presented by the media guidance application, which includes recommended listing 704 and a plurality of ordered listings 714 (e.g., by channel number).

The media guidance application may determine that an object appears in a first media asset, as described above in FIG. 1-2. The media guidance application may then determine the action associated with the context indicator (e.g., as described in FIG. 3-4) relates to alerting a user to a media asset listing with subject matter that corresponds to the first object. For example, the media guidance application may determine that a context indicator 712 "1ˢᵗ+Goal" for a first object 710, an arrow, displayed in the first media asset is associated with the action to alert the user to a media asset associated with the object, such as a currently airing game of team ABC. The media guidance application may retrieve subject matter of the first object 710 from a subject matter field of the data structure associated with the first object (e.g., as described in FIG. 3). For example, the media guidance application may retrieve that the subject matter relating to the arrow object with a context indicator of "1ˢᵗ+Goal" is any program relating to team "ABC."

The media guidance application may search for a first media asset listing associated with the retrieved subject matter. For example, the media guidance application may search a plurality of media asset listings in an electronic program guide to determine a media asset listing referring to team "ABC." The media guidance application may promote the first media asset listing among a plurality of displayed media asset listings. For example, the media guidance application may reorder the media asset listings such that a "recommended" section at the top of listings in a program guide displays a media asset listing 704 on channel 123, specifically for media asset 706 "ABC v. CDE." The media guidance application may additionally present a visual indication 708 of the object 710 and context indicator 712 that appear in the media asset. The visual indication may be a screenshot or a portion of the media asset 706 that contains the object 710.

Figure 8:
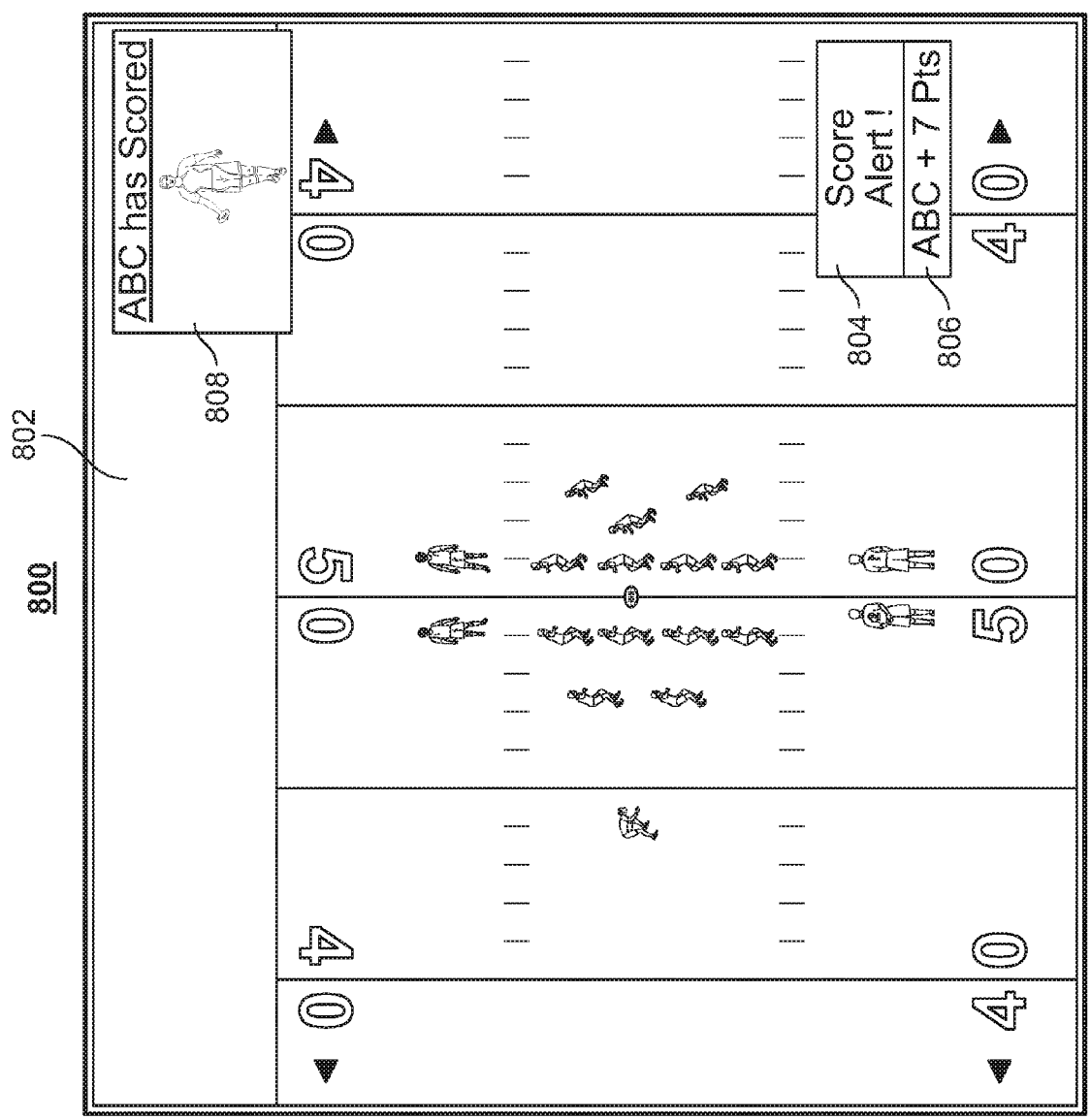
FIG. 8 shows an illustrative display of a media guidance application displaying a second media asset and the first media asset in accordance with some embodiments of the disclosure.

FIG. 8 shows an illustrative display of a media guidance application displaying a second media asset and the first media asset in accordance with some embodiments of the disclosure. For example, display 800 may be presenting a media guidance application displaying media asset 802. Display 800 may appear on one or more user devices (e.g., any of the devices listed in FIGS. 12-13 below). Moreover, the media guidance application may use one or more of the processes described in FIGS. 14-24 below to generate display 800 or any of the features described therein.

FIG. 8 includes display 800. Display 800 may appear on a display device (e.g., user equipment devices 1302, 1304, and/or 1306 (FIG. 13) below). Furthermore, control circuitry 1204, as described below in relation to FIG. 12, may be used to generate display 800. Display 800 includes media asset 802, as well as score alert 804 with context indicator 806 stating, "ABC+7 pts."

The media guidance application may determine that an object appears in a first media asset, as described above in FIG. 1-2. The media guidance application may then determine the action associated with the context indicator (e.g., as described in FIG. 3-4) relates to presenting supplemental information related to the object. For example, the media guidance application may determine that the object score alert 804 with a context indicator 806 "ABC+7 points" relates to presenting supplemental information, such as an overlay with a video highlight of the play that led to the scoring of points. The media guidance application may retrieve a pointer to a location of supplemental information related to the object from a supplemental information field of the data structure associated with the object. For example, the media guidance application may access the data structure of the "Score Alert" object and then access a supplemental information field, which may be stored in other properties 306, that points to a media content source (e.g, as described in FIG. 13) containing a video highlight of the play.

The media guidance application may access the location of the supplemental information. For example, the media guidance application may access the media content source where the video highlight is stored via a communications network (e.g., as described in FIG. 13). The media guidance application may retrieve the supplemental information. For example, the media guidance application may retrieve a video highlight of media asset 808. The media guidance application may generate a simultaneous display of the media asset and the supplemental information. For example, the media guidance application may generate the video highlight of media asset 808 over a section of media asset 802. As another example, the media guidance application could present statistics associated with a player or team in media asset 808 over a section of media asset 802.

Figure 9:
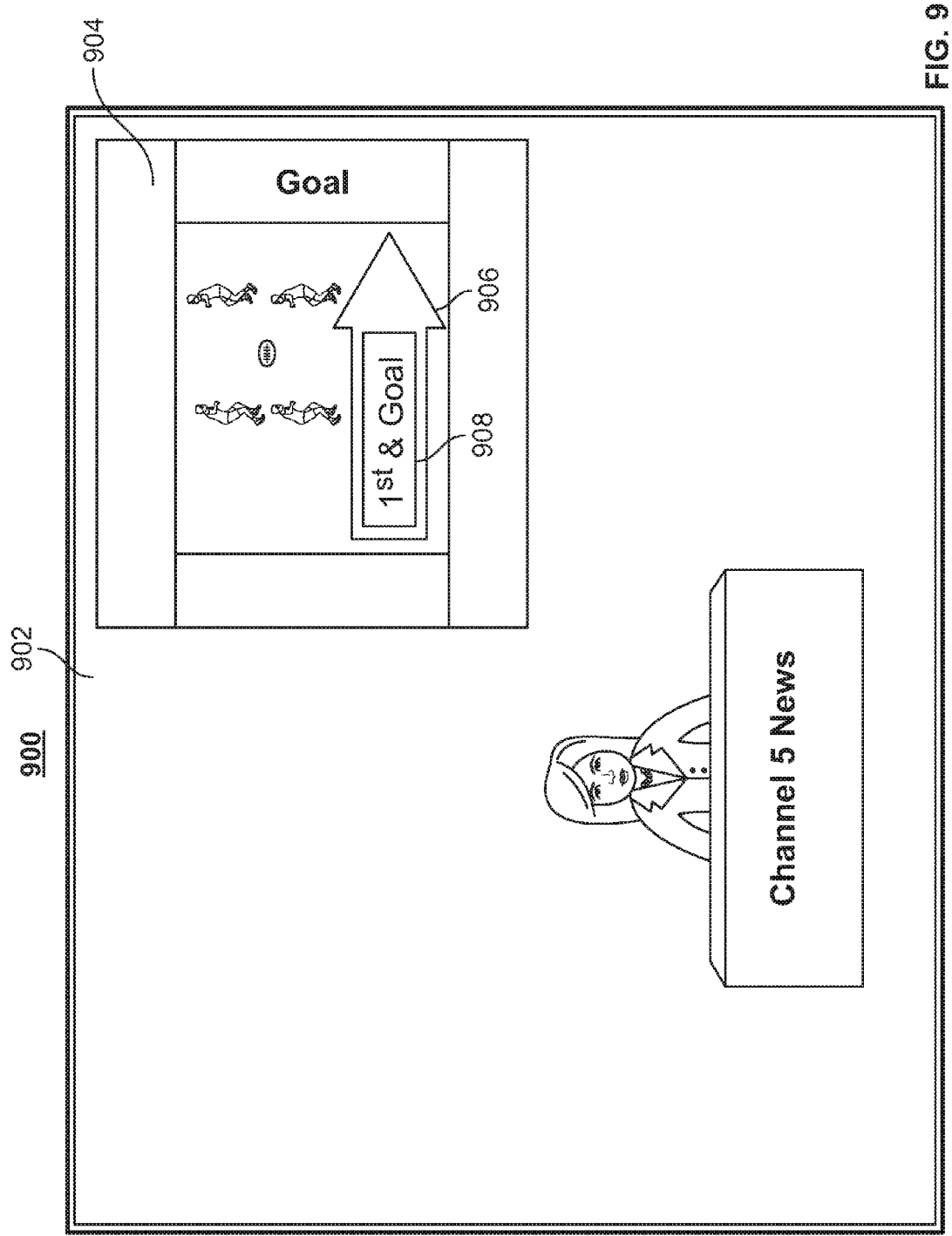
FIG. 9 shows another illustrative display of a media guidance application displaying a second media asset in accordance with some embodiments of the disclosure.

FIG. 9 shows another illustrative display of a media guidance application displaying a second media asset in accordance with some embodiments of the disclosure. For example, display 900 may be presenting a media guidance application displaying media asset 902. Display 900 may appear on one or more user devices (e.g., any of the devices listed in FIGS. 12-13 below). Moreover, the media guidance application may use one or more of the processes described in FIGS. 14-24 below to generate display 900 or any of the features described therein.

FIG. 9 includes display 900. Display 900 may appear on a display device (e.g., user equipment devices 1302, 1304, and/or 1306 (FIG. 13) below). Furthermore, control circuitry 1204, as described below in relation to FIG. 12, may be used to generate display 900. Display 900 includes media asset 8902, as well as an overlay with data from media asset 904, which contains object 906 with context 908.

The media guidance application may determine that an object appears in first media asset 904, as described above in FIG. 1-2. The media guidance application may then determine the action associated with context indicator 908 (e.g., as described in FIG. 3-4) relates to presenting first media asset 904 to the user simultaneously with second media asset 902 currently being accessed by the user. For example, the media guidance application may present a football game as an overlay on the program the user is currently accessing. The media guidance application may determine the user is not accessing the first media asset 904. For example, the media guidance application may determine that the user is currently viewing a news program. The media guidance application may retrieve the first media asset 904. For example, the media guidance application may retrieve the football game. The media guidance application may generate a simultaneous display of the first media asset 904 and the second media asset 902 currently being accessed by the user. For example, the media guidance application may generate for display the football game overlaid on a portion of the news program.

In some embodiments, the media guidance application performs a method for transmitting a portion of a media asset 904 containing an object 906 to a first user. For example, the media guidance application may transmit a portion of a football program containing an object indicating a touchdown was scored to the first user on a mobile device.

The media guidance application may determine that the first user is not watching media asset 904 on any device. In this case, the media guidance application may record, buffer, or receive in some other way the at least one frame of media asset 904, without generating media asset 904 for display.

The media guidance application may determine the first user is not accessing media asset 904 on any device. For example, the media guidance application may determine that all of the user equipment devices associated with the first user are either powered down or tuned to a different media asset, such as media asset 902 or any other media asset that is not media asset 904.

In some embodiments, the media guidance application may retrieve an identifier of a first user equipment device of a plurality of user equipment devices associated with the first user from the data structure containing the user profile associated with the first user. For example, the media guidance application may query, by executing a database query language script, such as SQL utilizing the declarative "Select" command, the data structure containing the user profile of the first user and determine there are two set-top boxes connected to televisions associated with the user's account.

Further, the media guidance application may then retrieve an identifier of one of the set-top boxes. The media guidance application may access a status of the first user equipment device. For example, the media guidance application may transmit a message to the set-top box to query the status of tuners contained in the set-top box. The media guidance application may determine, from the status that the first user equipment device is not accessing media asset 904. For example, the media guidance application may determine that since each tuner of a set-top box is tuned to a different program, the set-top box is not accessing the media asset.

The media guidance application may, in response to determining each of the plurality of user equipment devices associated with the first user is not accessing the media asset, determine the first user is not accessing the media asset. For example, if the media guidance application determines that each of the user equipment devices is not receiving media asset 904, the media guidance application may determine that the first user is not accessing the first media asset.

The media guidance application may detect a feature in the at least one frame and compare to objects stored in a database to determine the object 906 that appears in the football program as described above in FIG. 1-4.

The media guidance application may, in response to determining the feature corresponds to the first object 906 and the first user is not accessing media asset 904, store data corresponding to the at least one frame containing the object in memory. For example, the media guidance application may store a screenshot of the at least one frame containing the object. As another example, the media guidance application may store a portion of the media asset containing the object. As another example, the media guidance application may store a detailed description or media asset listing associated with the object. The media guidance application may determine what data to store based on the data structure associated with the object (e.g., the column of a table as described in FIG. 3). For example, the media guidance application may store in other properties 306 that if the first user is not watching the media asset in which the object is detected, to store certain data.

In some embodiments, the media guidance application may determine a first playback point in media asset 904 based on a first frame of the at least one frame containing object 906. For example, the media guidance application may determine the position of the first of the at least one frame relative to other frames of the media asset and determine the first playback point. For instance, the media guidance application may determine that the first frame of the at least one frame corresponds to a playback point of 10 minutes into the media asset. The media guidance application may store, from the first playback point, the portion of the media asset in memory. For example, the media guidance application may store frames of the media asset subsequent to the first frame in memory. The media guidance application may determine a second playback point in the media asset based on a second frame wherein the second frame does not contain object 906. For example, the media guidance application may determine the position of the second frame relative to other frames of the media asset and determine the second playback point. For instance, the media guidance application may determine that the second frame corresponds to a playback point of 15 minutes into the media asset. The media guidance application may cease the storing of the portion of the media asset in memory at the second playback point.

In some embodiments, the media guidance application may determine, from an information field of a data structure associated with the object, a pointer to a location of the information describing media asset 904. For example, the media guidance application may access the data structure of object 906 and retrieve a pointer that points to media guidance data source 1318 containing a description of media asset 904, such as the location of a football game and the records of both teams.

The media guidance application may access the location of the information describing the media asset. For example, the media guidance application may access media guidance data source where the description is stored via communications circuitry. The media guidance application may retrieve the information describing the media asset. For example, the media guidance application may retrieve the description of media asset 904.

The media guidance application may store the information describing the media asset in memory. For example, the media guidance application may store, in a data structure in a user profile associated with the first user, the description of media asset 904.

The media guidance application may retrieve an identifier of a mobile device of the first user from a data structure containing a user profile associated with the first user. For example, the media guidance application may retrieve an identifier of a mobile phone, such as telephone number of the mobile phone, associated with the first user.

In some embodiments, the media guidance application may access the data structure containing the user profile associated with the first user. The media guidance application may then query the data structure to determine if any mobile devices are associated with the first user. The media guidance application may then, in response to determining the first mobile device is associated with the first user, retrieve the identifier of the first mobile device associated with the first user. For example, the media guidance application may retrieve a telephone number corresponding to a mobile phone associated with the first user.

The media guidance application may transmit, to the mobile device associated with the first user, the stored data corresponding to the at least one frame containing the object. For example, the media guidance application may transmit a text message to the first user's mobile phone containing the stored data, or alternatively, a link to the stored data. As another example, the media guidance application may transmit the stored data to an email account, which may be opened on a mobile device. The media guidance application may transmit the stored data to another instance of the media guidance application executed by control circuitry on another user equipment device (e.g., user equipment devices 1302, 1304, and/or 1306 (FIG. 13) below).

In some embodiments, the media guidance application may determine the first mobile device has not received the transmitted stored data. For example, the media guidance application may request a receipt of transmission from the first mobile device. After not receiving an indication the transmission was successful in a threshold period of time, the media guidance application may determine the first mobile device has not received the stored data. For example, if the threshold period of time is 5 minutes and the media guidance application has not received a data packet or other transmission from the first mobile device acknowledging a successful transfer, the media guidance application may determine the first mobile device has not received the stored data.

In response, the media guidance application may query the data structure containing the user profile associated with the first user for a second mobile device associated with the first user. For example, the media guidance application may query the data structure and determine a second mobile phone is associated with the first user. The media guidance application may then retrieve an identifier, such as a telephone number, of a second mobile phone associated with the first user. The media guidance application may, in response to determining the second mobile device associated with the first user, transmit the stored data corresponding to the at least one frame containing the object to the second mobile device. For example, the media guidance application may transmit the stored data to the second mobile phone associated with the first user.

In some embodiments, in response to the mobile device receiving the transmission of the stored data, the media guidance application may generate for display on the mobile device an identifier of the media asset. For example, the media guidance application may generate for display an identifier of media asset 904, such as "Football Game," corresponding to object 906 stored in database 300, as described above in FIG. 3.

The media guidance application may generate for display on the mobile device a selectable option to access the stored data. For example, the media guidance application may generate for display an option to open the received stored data. In response to the first user selecting the option to access the stored data, the media guidance application may generate for display the stored data on the mobile device. For example, the media guidance application may generate for display a portion of media asset 904 containing object 906.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 10:
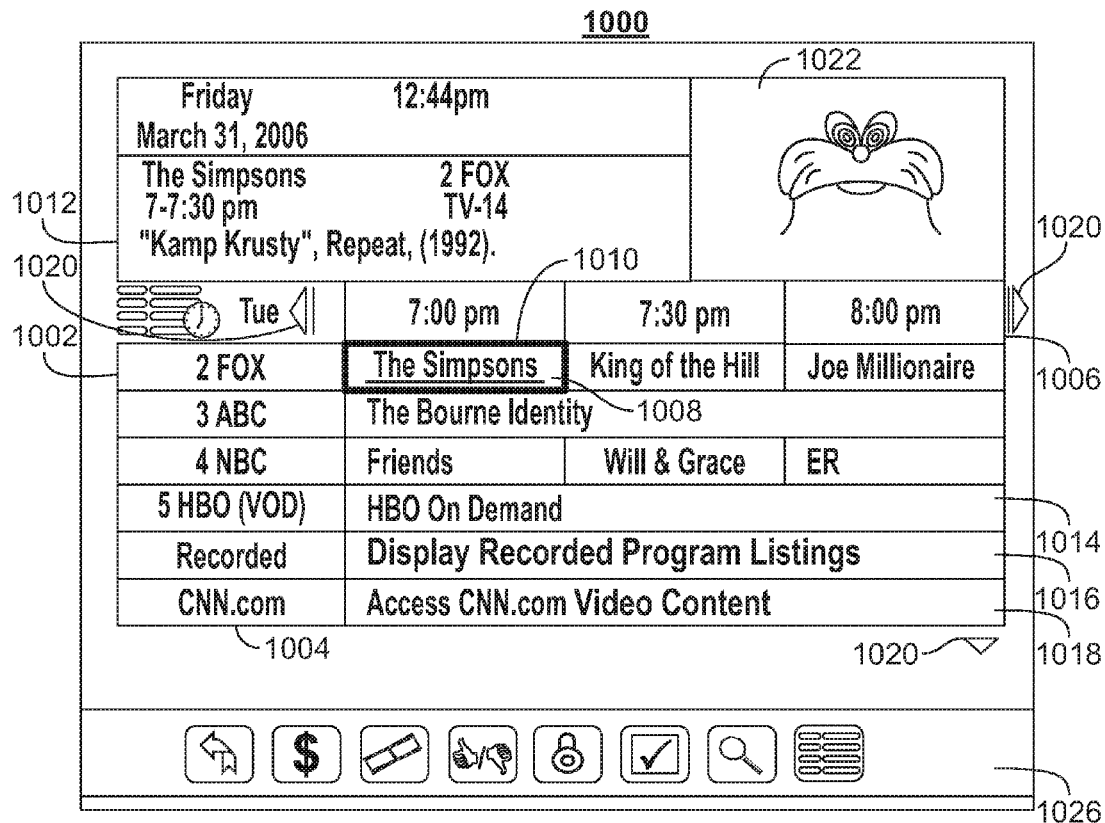
FIG. 10 shows an illustrative example of a display screen for use in accessing media content in accordance with some embodiments of the disclosure.
Figure 11:
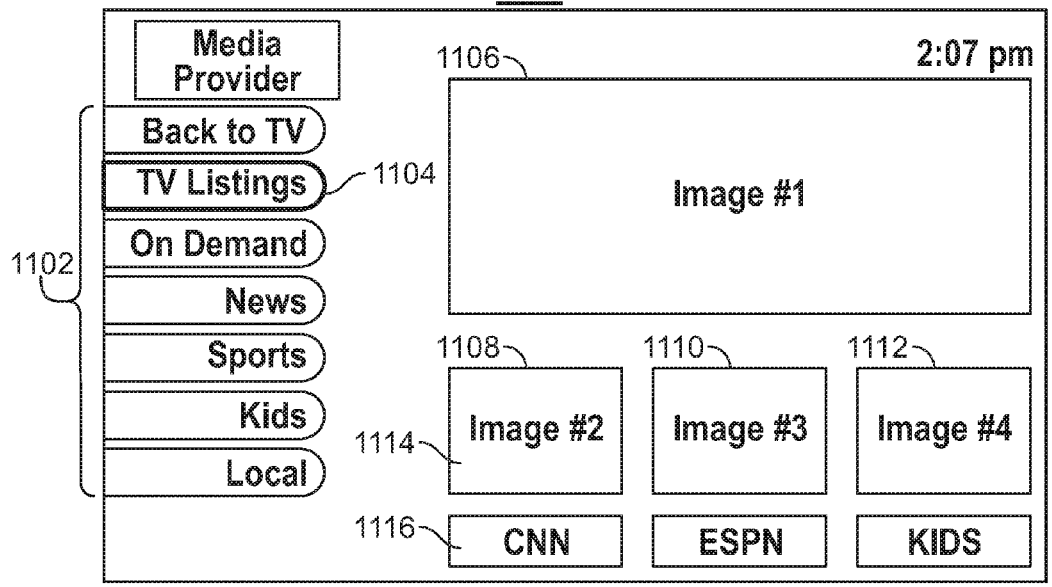
FIG. 11 shows another illustrative example of a display screen used access media content in accordance with some embodiments of the disclosure.

FIGS. 10-11 show illustrative display screens that may be used to provide media guidance data. The display screens shown in FIGS. 10-11 may be implemented on any suitable user equipment device or platform. While the displays of FIGS. 10-11 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 10 shows illustrative grid of a media asset listings display 1000 arranged by time and channel that also enables access to different types of content in a single display. Display 1000 may include grid 1002 with: (1) a column of channel/content type identifiers 1004, where each channel/content type identifier (which is a cell in the column) identifies a different channel or content type available; and (2) a row of time identifiers 1006, where each time identifier (which is a cell in the row) identifies a time block of programming. Grid 1002 also includes cells of media asset listings, such as media asset listing 1008, where each listing provides the title of the program provided on the listing's associated channel and time. With a user input device, a user can select media asset listings by moving highlight region 1010. Information relating to the media asset listing selected by highlight region 1010 may be provided in program information region 1012. Region 1012 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 1002 may provide media guidance data for non-linear programming including on-demand listing 1014, recorded content listing 1016, and Internet content listing 1018. A display combining media guidance data for content from different types of content sources is sometimes referred to as a "mixed-media" display. Various permutations of the types of media guidance data that may be displayed that are different than display 1000 may be based on user selection or guidance application definition (e.g., a display of only recorded and broadcast listings, only on-demand and broadcast listings, etc.). As illustrated, listings 1014, 1016, and 1018 are shown as spanning the entire time block displayed in grid 1002 to indicate that selection of these listings may provide access to a display dedicated to on-demand listings, recorded listings, or Internet listings, respectively. In some embodiments, listings for these content types may be included directly in grid 1002. Additional media guidance data may be displayed in response to the user selecting one of the navigational icons 1020. (Pressing an arrow key on a user input device may affect the display in a similar manner as selecting navigational icons 1020.)

Display 1000 may also include video region 1022, and options region 1026. Video region 1022 may allow the user to view and/or preview programs that are currently available, will be available, or were available to the user. The content of video region 1022 may correspond to, or be independent from, one of the listings displayed in grid 1002. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 1026 may allow the user to access different types of content, media guidance application displays, and/or media guidance application features. Options region 1026 may be part of display 1000 (and other display screens described herein), or may be invoked by a user by selecting an on-screen option or pressing a dedicated or assignable button on a user input device. The selectable options within options region 1026 may concern features related to media asset listings in grid 1002 or may include options available from a main menu display. Features related to media asset listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 13. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 11. Video mosaic display 1100 includes selectable options 1102 for content information organized based on content type, genre, and/or other organization criteria. In display 1100, television listings option 1104 is selected, thus providing listings 1106, 1108, 1110, and 1112 as broadcast media asset listings. In display 1100 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 1108 may include more than one portion, including media portion 1114 and text portion 1116. Media portion 1114 and/or text portion 1116 may be selectable to view content in full-screen or to view information related to the content displayed in media portion 1114 (e.g., to view listings for the channel that the video is displayed on).

The listings in display 1100 are of different sizes (i.e., listing 1106 is larger than listings 1108, 1110, and 1112), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/

0153885, filed Nov. 12, 2009, which is hereby incorporated by reference herein in its entirety.

Figure 12:
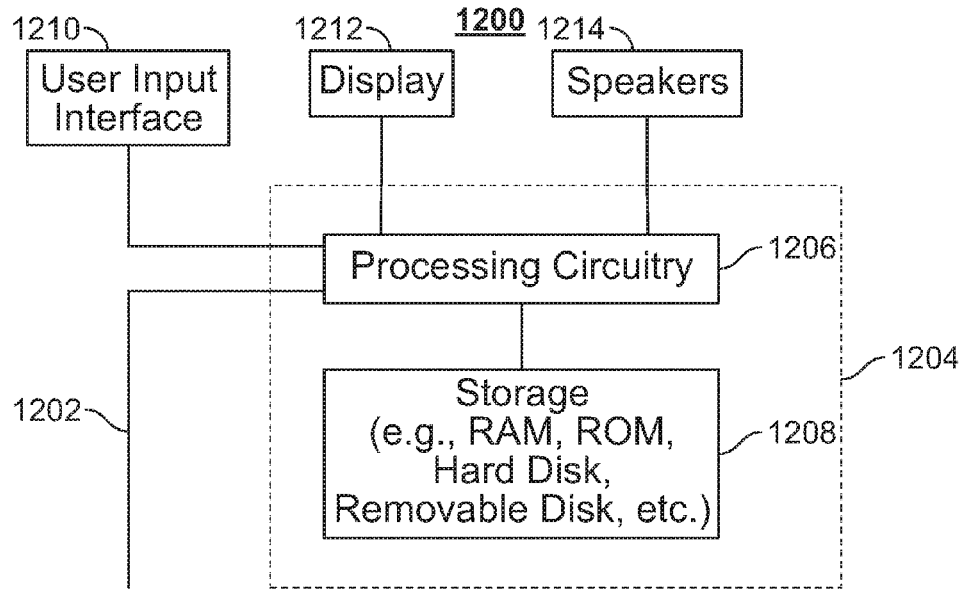
FIG. 12 is a block diagram of an illustrative user equipment device in accordance with some embodiments of the disclosure.

Users may access content and the media guidance application (and its display screens described above and below) from one or more of their user equipment devices. FIG. 12 shows a generalized embodiment of illustrative user equipment device 1200. More specific implementations of user equipment devices are discussed below in connection with FIG. 13. User equipment device 1200 may receive content and data via input/output (hereinafter "I/O") path 1202. I/O path 1202 may provide content (e.g., broadcast programming, on-demand programming, Internet content, content available over a local area network (LAN) or wide area network (WAN), and/or other content) and data to control circuitry 1204, which includes processing circuitry 1206 and storage 1208. Control circuitry 1204 may be used to send and receive commands, requests, and other suitable data using I/O path 1202. I/O path 1202 may connect control circuitry 1204 (and specifically processing circuitry 1206) to one or more communications paths (described below). I/O functions may be provided by one or more of these communications paths, but are shown as a single path in FIG. 12 to avoid overcomplicating the drawing.

Control circuitry 1204 may be based on any suitable processing circuitry such as processing circuitry 1206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1204 executes instructions for a media guidance application stored in memory (i.e., storage 1208). Specifically, control circuitry 1204 may be instructed by the media guidance application to perform the functions discussed above and below. For example, the media guidance application may provide instructions to control circuitry 1204 to generate the media guidance displays. In some implementations, any action performed by control circuitry 1204 may be based on instructions received from the media guidance application.

In client-server based embodiments, control circuitry 1204 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 13). In addition, communications circuitry may include circuitry that enables peer-to-peer communication of user equipment devices, or communication of user equipment devices in locations remote from each other (described in more detail below).

Memory may be an electronic storage device provided as storage 1208 that is part of control circuitry 1204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1208 may be used to store various types of content described herein as well as media guidance data described above. Nonvolatile memory may also be used (e.g., to launch a boot-up routine and other instructions). Cloud-based storage, described in relation to FIG. 13, may be used to supplement storage 1208 or instead of storage 1208. For example, storage 1208 may be used to store a database of objects with data structures associated with each object. The database of objects may be stored in cloud-based storage, so that local copies of the database (e.g., stored in storage 1208) are not needed, thus saving storage on user equipment devices (e.g., any of the user equipment devices discussed in FIG. 13).

Control circuitry 1204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1204 may also include scaler circuitry for upconverting and downconverting content into the preferred output format of the user equipment 1200. Circuitry 1204 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1208 is provided as a separate device from user equipment 1200, the tuning and encoding circuitry (including multiple tuners) may be associated with storage 1208.

A user may send instructions to control circuitry 1204 using user input interface 1210. User input interface 1210 may be any suitable user interface, such as a remote control, mouse, trackball, keypad, keyboard, touch screen, touchpad, stylus input, joystick, voice recognition interface, or other user input interfaces. Display 1212 may be provided as a stand-alone device or integrated with other elements of user equipment device 1200. For example, display 1212 may be a touchscreen or touch-sensitive display. In such circumstances, user input interface 1210 may be integrated with or combined with display 1212. Display 1212 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 1212 may be HDTV-capable. In some embodiments, display 1212 may be a 3D display, and the interactive media guidance application and any suitable content may be displayed in 3D. A video card or graphics card may generate the output to the display 1212. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 1204. The video card may be integrated with the control circuitry 1204. Speakers 1214 may be provided as integrated with other elements of user equipment device 1200 or may be stand-alone units. The audio component of videos and other content displayed on display 1212 may be played through speakers 1214. In some embodiments, the audio may be distributed to a receiver (not shown), which processes and outputs the audio via speakers 1214.

The guidance application may be implemented using any suitable architecture. For example, the guidance application may be a stand-alone application wholly-implemented on user equipment device 1200. In such an approach, instructions of the application are stored locally (e.g., in storage 1208), and data for use by the application is downloaded on a periodic basis (e.g., from an out-of-band feed, from an Internet resource, or using another suitable approach). Control circuitry 1204 may retrieve instructions of the application from storage 1208 and process the instructions to generate any of the displays discussed herein. Based on the processed instructions, control circuitry 1204 may determine what action to perform when input is received from input interface 1210. For example, movement of a cursor on a display up/down may be indicated by the processed instructions when input interface 1210 indicates that an up/down button was selected.

In some embodiments, the media guidance application is a client-server based application. Data for use by a thick or thin client implemented on user equipment device 1200 is retrieved on-demand by issuing requests to a server remote to the user equipment device 1200. In one example of a client-server based guidance application, control circuitry 1204 runs a web browser that interprets web pages provided by a remote server. For example, the remote server may store the instructions for the application in a storage device. The remote server may process the stored instructions using circuitry (e.g., control circuitry 1204) and generate the displays discussed above and below. The client device may receive the displays generated by the remote server and may display the content of the displays locally on equipment device 1200. This way, the processing of the instructions is performed remotely by the server while the resulting displays are provided locally on equipment device 1200. Equipment device 1200 may receive inputs from the user via input interface 1210 and transmit those inputs to the remote server for processing and generating the corresponding displays. For example, equipment device 1200 may transmit a communication to the remote server indicating that an up/down button was selected via input interface 1210. The remote server may process instructions in accordance with that input and generate a display of the application corresponding to the input (e.g., a display that moves a cursor up/down). The generated display is then transmitted to equipment device 1200 for presentation to the user.

In some embodiments, the media guidance application is downloaded and interpreted or otherwise run by an interpreter or virtual machine (run by control circuitry 1204). In some embodiments, the guidance application may be encoded in the ETV Binary Interchange Format (EBIF), received by control circuitry 1204 as part of a suitable feed, and interpreted by a user agent running on control circuitry 1204. For example, the guidance application may be an EBIF application. In some embodiments, the guidance application may be defined by a series of JAVA-based files that are received and run by a local virtual machine or other suitable middleware executed by control circuitry 1204. In some of such embodiments (e.g., those employing MPEG-2 or other digital media encoding schemes), the guidance application may be, for example, encoded and transmitted in an MPEG-2 object carousel with the MPEG audio and video packets of a program.

Figure 13:
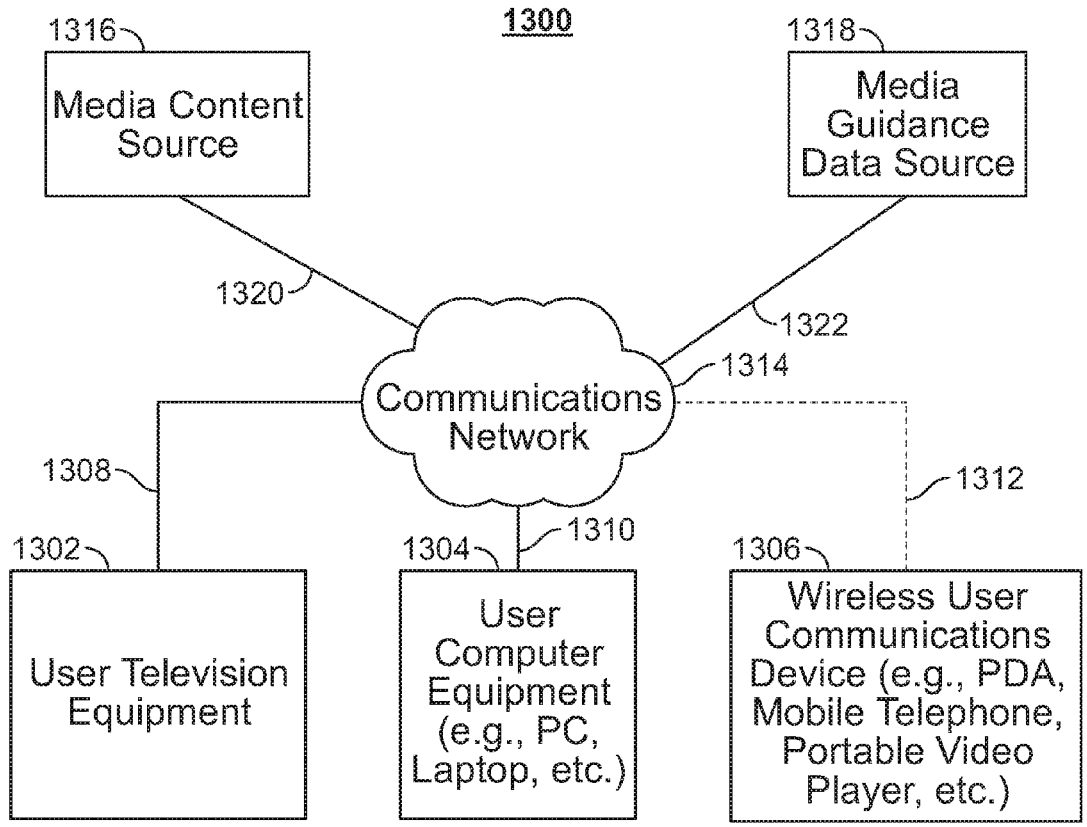
FIG. 13 is a block diagram of an illustrative media system in accordance with some embodiments of the disclosure.

User equipment device 1200 of FIG. 12 can be implemented in system 1300 of FIG. 13 as user television equipment 1302, user computer equipment 1304, wireless user communications device 1306, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 12 may not be classified solely as user television equipment 1302, user computer equipment 1304, or a wireless user communications device 1306. For example, user television equipment 1302 may, like some user computer equipment 1304, be Internet-enabled allowing for access to Internet content, while user computer equipment 1304 may, like some television equipment 1302, include a tuner allowing for access to television programming. The media guidance application may have the same layout on various different types of user equipment or may be tailored to the display capabilities of the user equipment. For example, on user computer equipment 1304, the guidance application may be provided as a web site accessed by a web browser. In another example, the guidance application may be scaled down for wireless user communications devices 1306.

In system 1300, there is typically more than one of each type of user equipment device but only one of each is shown in FIG. 13 to avoid overcomplicating the drawing. In addition, each user may utilize more than one type of user equipment device and also more than one of each type of user equipment device.

In some embodiments, a user equipment device (e.g., user television equipment 1302, user computer equipment 1304, wireless user communications device 1306) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1314. Namely, user television equipment 1302, user computer equipment 1304, and wireless user communications device 1306 are coupled to communications network 1314 via communications paths 1308, 1310, and 1312, respectively. Communications network 1314 may be one or more networks including the Internet, a mobile phone network, mobile voice or data network (e.g., a 4G or LTE network), cable network, public switched telephone network, or other types of communications network or combinations of communications networks. Paths 1308, 1310, and 1312 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1312 is drawn with dotted lines to indicate that in the exemplary embodiment shown in FIG. 13 it is a wireless path and paths 1308 and 1310 are drawn as solid lines to indicate they are wired paths (although these paths may be wireless paths, if desired). Communications with the user equipment devices may be provided by one or more of these communications paths, but are shown as a single path in FIG. 13 to avoid overcomplicating the drawing.

Although communications paths are not drawn between user equipment devices, these devices may communicate directly with each other via communication paths, such as those described above in connection with paths 1308, 1310, and 1312, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1314.

System 1300 includes content source 1316 and media guidance data source 1318 coupled to communications network 1314 via communication paths 1320 and 1322, respectively. Paths 1320 and 1322 may include any of the communication paths described above in connection with paths 1308, 1310, and 1312. Communications with the content source 1316 and media guidance data source 1318 may be exchanged over one or more communications paths, but are shown as a single path in FIG. 13 to avoid overcomplicating the drawing. In addition, there may be more than one of each of content source 1316 and media guidance data source 1318, but only one of each is shown in FIG. 13 to avoid overcomplicating the drawing. (The different types of each of these sources are discussed below.) If desired, content source 1316 and media guidance data source 1318 may be integrated as one source device. Although communications between sources 1316 and 1318 with user equipment devices 1302, 1304, and 1306 are shown as through communications network 1314, in some embodiments, sources 1316 and 1318 may communicate directly with user equipment devices 1302, 1304, and 1306 via communication paths (not shown) such as those described above in connection with paths 1308, 1310, and 1312.

Content source 1316 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1316 may be the originator of content (e.g., a television broadcaster, a Webcast provider, etc.) or may not be the originator of content (e.g., an on-demand content provider, an Internet provider of content of broadcast programs for downloading, etc.). Content source 1316 may include cable sources, satellite providers, on-demand providers, Internet providers, over-the-top content providers, or other providers of content. Content source 1316 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1318 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1318 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1318 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1318 may provide user equipment devices 1302, 1304, and 1306 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 1208, and executed by control circuitry 1204 of a user equipment device 1200. In some embodiments, media guidance applications may be client-server applications where only a client application resides on the user equipment device, and server application resides on a remote server. For example, media guidance applications may be implemented partially as a client application on control circuitry 1204 of user equipment device 1200 and partially on a remote server as a server application (e.g., media guidance data source 1318) running on control circuitry of the remote server. When executed by control circuitry of the remote server (such as media guidance data source 1318), the media guidance application may instruct the control circuitry to generate the guidance application displays and transmit the generated displays to the user equipment devices. The server application may instruct the control circuitry of the media guidance data source 1318 to transmit data for storage on the user equipment. The client application may instruct control circuitry of the receiving user equipment to generate the guidance application displays.

Content and/or media guidance data delivered to user equipment devices 1302, 1304, and 1306 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1300 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 13.

In one approach, user equipment devices may communicate with each other within a home network. User equipment devices can communicate with each other directly via short-range point-to-point communication schemes described above, via indirect paths through a hub or other similar device provided on a home network, or via communications network 1314. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1316 to access content. Specifically, within a home, users of user television equipment 1302 and user computer equipment 1304 may access the media guidance application to navigate among and locate desirable content. Users may also access the media guidance application outside of the home using wireless user communications devices 1306 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1314. These cloud resources may include one or more content sources 1316 and one or more media guidance data sources 1318. In addition or in the alternative, the remote computing sites may include other user equipment devices, such as user television equipment 1302, user computer equipment 1304, and wireless user communications device 1306. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1304 or wireless user communications device 1306 having content capture feature. Alternatively, the user can first transfer the content to a user equipment device, such as user computer equipment 1304. The user equipment device storing the content uploads the content to the cloud using a data transmission service on communications network 1314. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 12.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 14:
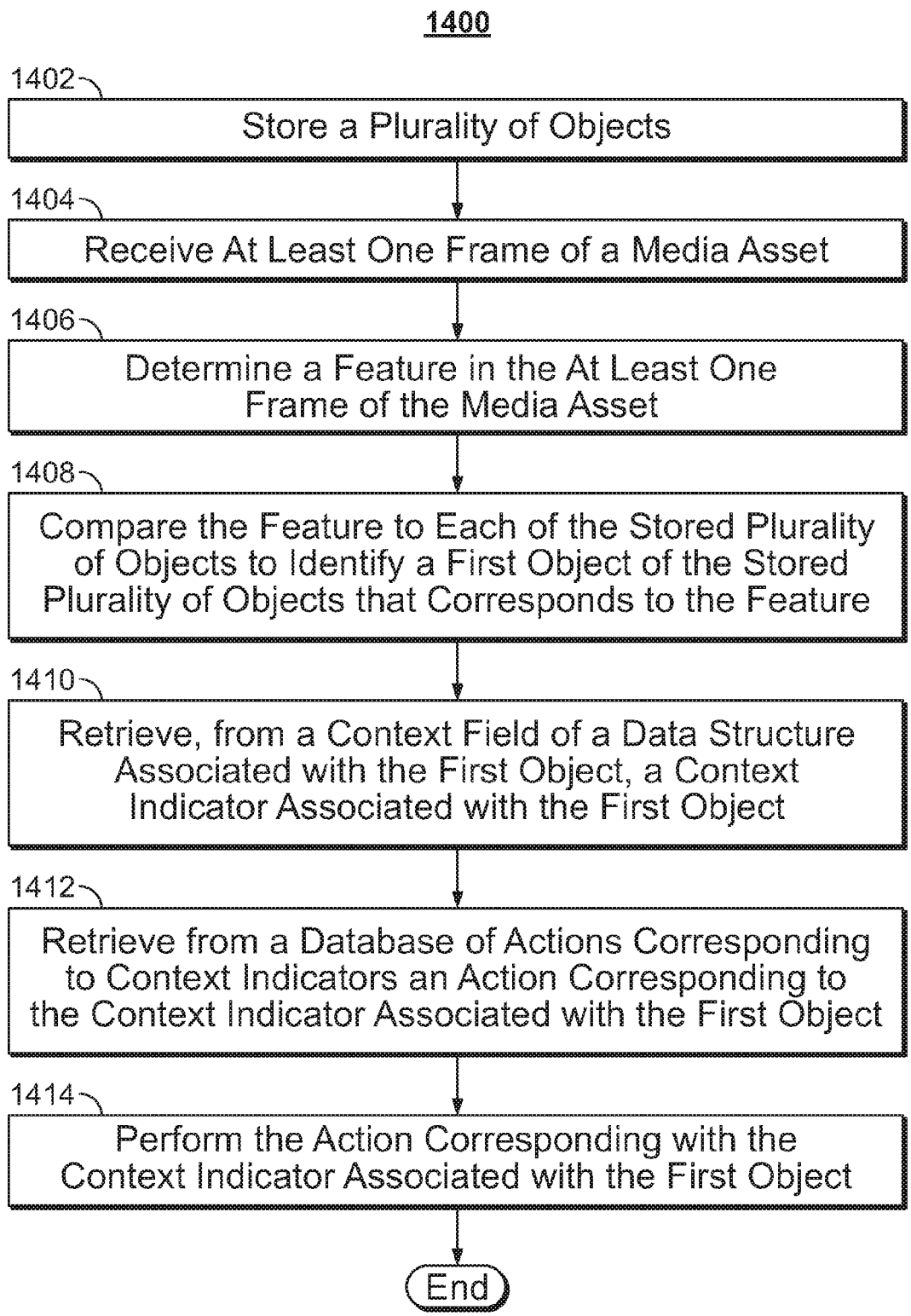
FIG. 14 is a flowchart of illustrative steps for performing an action based on context of a feature in a media asset in accordance with some embodiments of the disclosure.

FIG. 14 is a flowchart of illustrative steps for performing an action based on context of a feature in a media asset in accordance with some embodiments of the disclosure. Process 1400 may be used to determine an action to perform based on the context of a feature detected in a media asset. It should be noted that process 1400 or any step thereof, could occur on, or be provided by, any of the devices shown in FIGS. 12-13. For example, process 1400 may be executed by control circuitry 1204 as instructed by the media guidance application (e.g., implemented on any of the devices shown and described in FIG. 13).

Process 1400 begins at 1402, where the media guidance application may store a plurality of objects. For example, the media guidance application may maintain a database stored in memory (e.g., storage 1208) of objects containing information about media assets they commonly apply to, contexts where the objects appear, and properties of the objects. For example, the media guidance application may organize the objects into a table where each column describes properties of an object, as described in detail in FIG. 3.

Process 1400 may continue to 1404, where the media guidance application may receive at least one frame of a media asset. For example, the media guidance application may record an entire football game in memory (e.g., storage 1208) and examine each of the frames of the game for an object. Alternatively, the media guidance application may examine the frames of live programming for objects as the frames are received. For example, the media guidance application may examine each frame as the frame is presented on a display (e.g., display 1212) for objects. Alternatively, the media guidance application may store a buffer of live programming such that a number of frames before the currently displayed frame, after the currently displayed frame, or both, are analyzed to determine if any of the frames contain objects. For example, the media guidance application may maintain a buffer of ten frames in memory (e.g., in storage 1208), such that a display (e.g., display 1212) displays the eleventh most recently received frame and the ten more recently received frames are analyzed by the media guidance application for objects.

Process 1400 may continue to 1406, where the media guidance application may determine a feature in the at least one frame of the media asset. For example, the media guidance application may determine that a feature (e.g., arrow feature 104) is present in the at least one frame of the media asset (e.g., media asset 102). In some embodiments, the media guidance application may determine the feature by examining the patterns of particular subsets of pixels in the at least one frame of the media asset (e.g., media asset 102), as described further in FIG. 16. In other embodiments, the media guidance application may determine the feature by analyzing patterns in the waveform of an audio track. For example, the media guidance application may determine that the appearance of particular frequencies that appear in a repeated pattern in the media asset (e.g., media asset 102) corresponds to a feature. The media guidance application may store the patterns associated with features in memory (e.g., storage 1208).

Process 1400 may continue to 1408, where the media guidance application may compare the feature to each of the stored plurality of objects to identify a first object of the stored plurality of objects that corresponds to the feature. For example, in response to determining that the at least one frame contains the feature (e.g., arrow feature 104), the media guidance application may compare the properties of the feature (e.g., arrow feature 104) with the properties of objects stored in memory (e.g., storage 1208). The media guidance application may compare the feature to objects based on the genre, channel, or other commonalities of media assets for which the media guidance application has defined a library of objects, as described further in FIG. 17. The media guidance application may then determine whether the feature (e.g., arrow feature 104) corresponds to an arrow object stored in memory (e.g., storage 1208).

Process 1400 may continue to 1410, where the media guidance application may retrieve, from a context field of a data structure associated with the first object, a context indicator associated with the first object. For example, the media guidance application may store in the data structure associated with the arrow object context indicators such as "$1^{st}+10$" or "$3^{rd}+$Goal," which indicate the context of the arrow in the football game. Context indicators could additionally be any characteristic that relates to the object, such as its color, as described further in FIG. 18.

Process 1400 may continue to 1412, where the media guidance application may retrieve from a database of actions corresponding to context indicators an action corresponding to the context indicator associated with the first object. For example, upon determining the context indicator (e.g., context indicator 106) that applies to the currently detected object, the media guidance application may access a database of actions stored in memory (e.g., storage 1208), and determine which action corresponds to the context indicator, as described further in FIG. 18 below. For instance, the media guidance application may retrieve a context indicator for the feature (e.g., arrow 104) in the media asset (e.g., media asset 102) of "$1^{st}+10$;" the corresponding stored action may instruct the media guidance application to skip to this point in a recording once the object is detected, since "$1^{st}+10$" represents the beginning of a set of downs in a football game, which likely corresponds to action the user will find entertaining.

Process 1400 may continue to 1414, where the media guidance application may perform the action corresponding with the context indicator associated with the first object. For example, upon retrieving from a database containing objects stored in memory (e.g., storage 1208) that the action associated with "$1^{st}+10$" is to move to that playback point, the media guidance application may execute instructions to move to the playback point of the feature (e.g., arrow 104) with a context indicator (e.g., context indicator 106), "$1^{st}+10$," as described further in FIG. 19.

Figure 15:
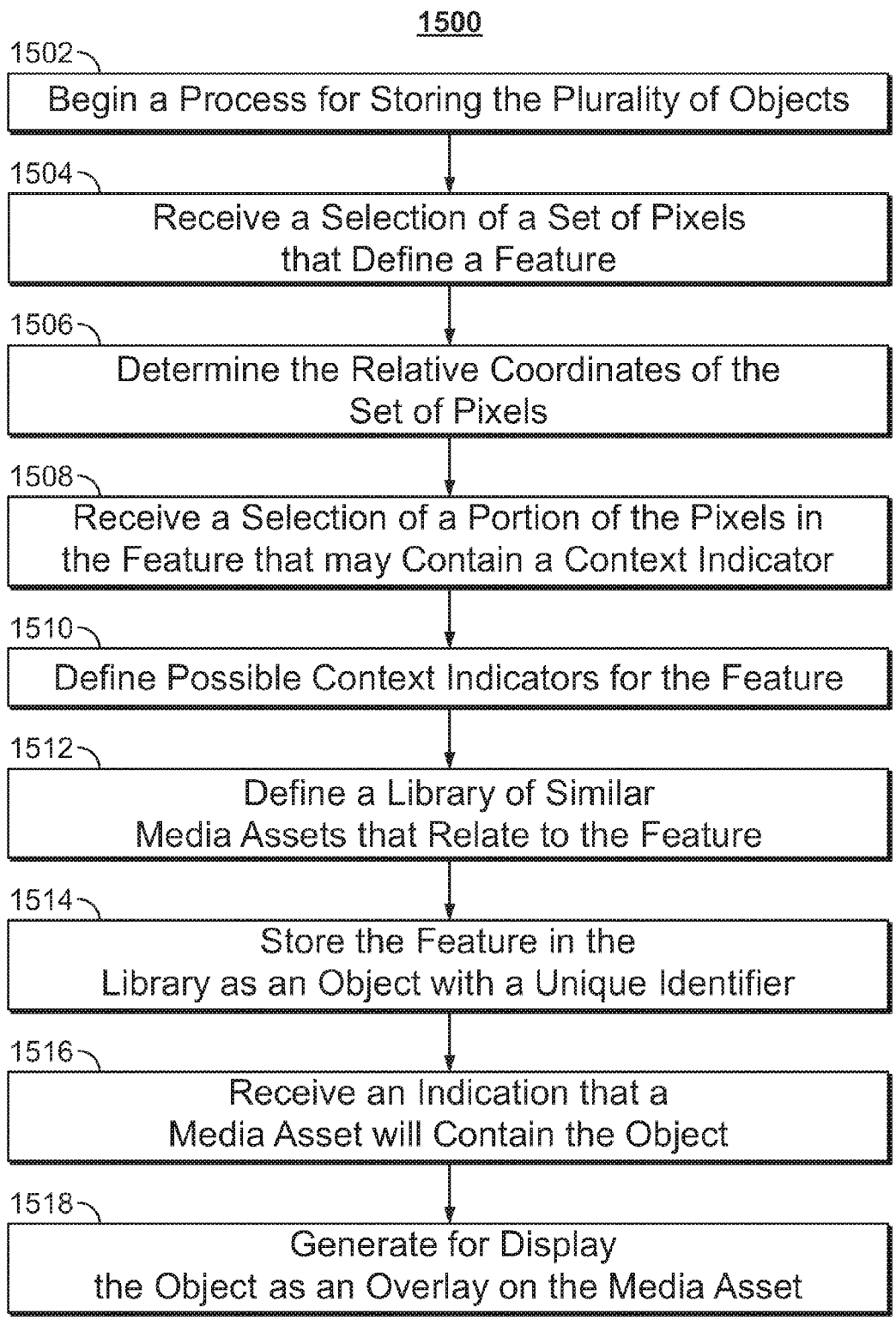
FIG. 15 is a flowchart of illustrative steps for storing the plurality of objects in accordance with some embodiments of the disclosure.

FIG. 15 is a flowchart of illustrative steps for storing the plurality of objects in accordance with some embodiments of the disclosure. Process 1500 may be used to define features and properties of an object and store the object in memory (e.g., storage 1208) so that the object may be detected by the media guidance application. It should be noted that process 1500 or any step thereof, could occur on, or be provided by, any of the devices shown in FIGS. 12-13. For example, process 1500 may be executed by control circuitry 1204 as instructed by the media guidance application (e.g., implemented on any of the devices shown and described in FIG. 13).

Process 1500 begins at 1502, where the media guidance application may begin a process for storing the plurality of objects. For example, the media guidance application may display (e.g., on display 1212) a new object creation screen, as described in FIG. 2, where the user may define properties of a new object. Alternatively, the media guidance application may automatically define new objects based on observing similar properties of pixels in frames of media assets.

Process 1500 may continue to 1504, where the media guidance application may receive a selection of a set of pixels that define a feature. For example, the media guidance application may receive a user input (e.g., using user input interface 1210) of a selection of a particular feature, such as arrow 204. For instance, the media guidance application may receive the user input as a traced image from a frame of a media asset to define the feature (e.g., arrow 204). Alternatively, the user may draw the feature (e.g., arrow 204) without reference to a frame from a media asset. Alternatively, the media guidance application may determine that a feature, defined by characteristics of the pixels in frames of the media asset, is common to a plurality of media assets and create the feature (e.g., arrow 204) without further user input.

Process 1500 may continue to 1506, where the media guidance application may determine the relative coordinates of the set of pixels. For example, the media guidance application may define for each pixel in the set of pixels a relative position in (x,y) coordinate space for the pixel. This allows the media guidance application to compare a feature detected in a media asset to objects stored in memory (e.g., storage 1208), as described further in FIG. 17.

Process 1500 may continue to 1508, where the media guidance application may receive a selection of a portion of the pixels in the feature that may contain a context indicator. For example, the media guidance application may receive a user selection (e.g., using user input interface 1210) of a rectangular box where text describing the feature generally appears, (i.e., that gives the object context such as "$1^{st}+10$" which defines the specific down and distance for a play in a football game).

Process 1500 may continue to 1510, where the media guidance application may define possible context indicators for the feature. For example the media guidance application may store text describing the feature in storage 1208 in a table, (e.g., context table 208), where a plurality of possible contexts are listed which may appear as the context indicator (e.g., context indicator 206) in the feature (e.g., feature 204).

Process 1500 may continue to 1512, where the media guidance application may define a library of similar media assets that relate to the feature. For example, if the media guidance application determines that the feature (e.g., arrow 204) is commonly displayed in football related media assets, the media guidance application may associate the arrow object with the related media assets (e.g., football games 212). Alternatively, the media guidance application may receive a user input (e.g., using user input interface 1210) of particular media assets that the feature is associated with, such as, "sports programs."

Process 1500 may continue to 1514, where the media guidance application may store the feature in the library as an object with a unique identifier. For example, the media guidance application may store in storage 1208 the properties associated with the feature (e.g., arrow feature 204) in the object (e.g., arrow object 202) in a library containing other objects associated with sporting events. The properties and organization of objects in the library of objects are discussed further above in FIG. 3.

Process 1500 may continue to 1516, where the media guidance application may receive an indication that a media asset will contain the object. For example, the media guidance application may receive an indication, such as an indication in a data packet of a media asset stream. The indication may be a flag that indicates the incoming media asset stream contains an object and may further contain an identifier of the object the media asset contains.

Process 1500 may continue to 1518, where the media guidance application may generate for display (e.g., on display 1212) the object as an overlay on the media asset. For example, upon receiving an indication, such as an indication in a data packet of a media asset stream, the media guidance application may overlay the object (e.g., arrow object 202) on the media asset. The media guidance application may then generate for display (e.g., on display 1212) the media asset containing the object.

Figure 16:
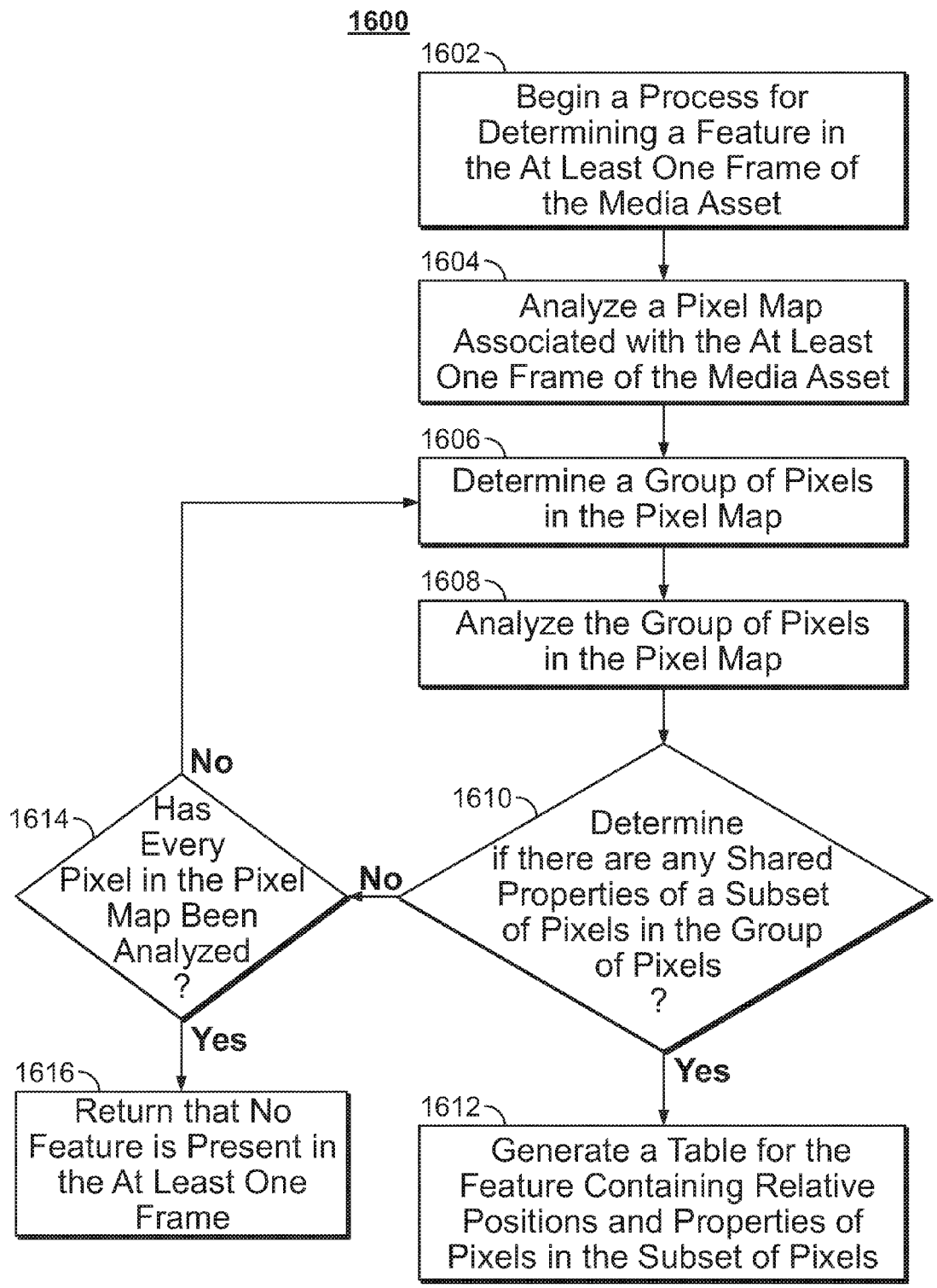
FIG. 16 is a flowchart of illustrative steps for determining a feature in the at least one frame of the media asset in accordance with some embodiments of the disclosure.

FIG. 16 is a flowchart of illustrative steps for determining a feature in the at least one frame of the media asset in accordance with some embodiments of the disclosure. Process 1600 may be used to determine features in media assets that may correspond to objects so that they may be compared to a database of objects. It should be noted that process 1600 or any step thereof, could occur on, or be provided by, any of the devices shown in FIGS. 12-13. For example, process 1600 may be executed by control circuitry 1204 as instructed by the media guidance application (e.g., implemented on any of the devices shown and described in FIG. 13).

Process 1600 begins at 1602, where the media guidance application may begin a process for determining a feature in the at least one frame of the media asset. For example, the media guidance application may determine that an arrow feature is present by examining pixels in the at least one frame and determining the context indicator (e.g., context indicator 206) and the feature (e.g., feature 204) in a similar manner to that described above for creating new objects (e.g., object 202). Once the media guidance application has mapped the feature and a table of pixel coordinates (e.g., table of pixel coordinates 210) has been created for the feature, the feature may be compared to objects stored in memory (e.g., storage 1208).

Process 1600 may continue to 1604, where the media guidance application may analyze a pixel map associated with the at least one frame of the media asset. For example, the media guidance application may define a pixel map for a frame in the media asset, where each pixel in the frame has a distinct position (e.g., table of pixel coordinates 210). The media guidance application may additionally include properties of each pixel, such as the red-green-blue color number or brightness for each pixel position.

Process 1600 may continue to 1606, where the media guidance application may determine a group of pixels in the pixel map. For example, the media guidance application may determine a group of pixels in a similar location to comprise the group of pixels. The media guidance application may retrieve pixel coordinates of a first pixel from the pixel map and, based on a defined distance from the first pixel, select nearby pixels to comprise the group of pixels.

Process 1600 may continue to 1608, where the media guidance application may analyze the group of pixels in the pixel map. For example, the media guidance application may iteratively compare the first pixel to the other pixels in the group of pixels. The media guidance application may partition the group of pixels into subsets of pixels and compare the properties of a subset of pixels near the first pixel to the first pixel.

Process 1600 may continue to 1610, where the media guidance application may determine if there are any shared properties of a subset of pixels in the group of pixels. For example, the media guidance application may determine that every pixel in a particular horizontal line has similar properties by iteratively comparing the data stored in the pixel map for each pixel to every other pixel. The similar properties could be that data for each pixel in the horizontal line contains the same red-green-blue color number in the pixel map, and as such, the line is a solid color. Alternatively, the media guidance application may determine that the pixels in the subset of pixels do not exhibit any recognizable pattern. The media guidance application may iterate through and analyze each subset of the group of pixels for features.

If a feature is determined in step 1610, process 1600 may continue to 1612, where the media guidance application may generate a table for the feature containing relative positions and properties of pixels in the subset of pixels. The media guidance application may generate a table (e.g., table of pixel coordinates 210) for the feature containing relative positions and properties of pixels in the subset of pixels. For example, the media guidance application may store the relative positions of a horizontal line feature, defined by the subset of pixels, as coordinates as well as any additional properties, such as color and brightness, in a table or other data structure stored in memory (e.g., storage 1208 or at a remote server accessible via communications network 1314).

If no feature is determined in step 1610, process 1600 may proceed to 1614 and determine whether every pixel in the pixel map has been analyzed. For example, the media guidance application may maintain a data structure, such as an array, of pixels the media guidance application has analyzed and compared. By comparing the pixels stored in the array with those in the pixel map, the media guidance application may determine whether every pixel in the pixel map has been analyzed. If every pixel in the pixel map has been analyzed, process 1600 may continue to 1616, where the media guidance application may return that no feature is present in the at least one frame. If every pixel in the pixel map has not been analyzed, process 1600 may return to 1606 and determine a new group of pixels in the pixel map. For example, the media guidance application may select pixels for the new group of pixels to analyze based on determining the pixels are not stored in the array of pixels that have already been analyzed.

Figure 17:
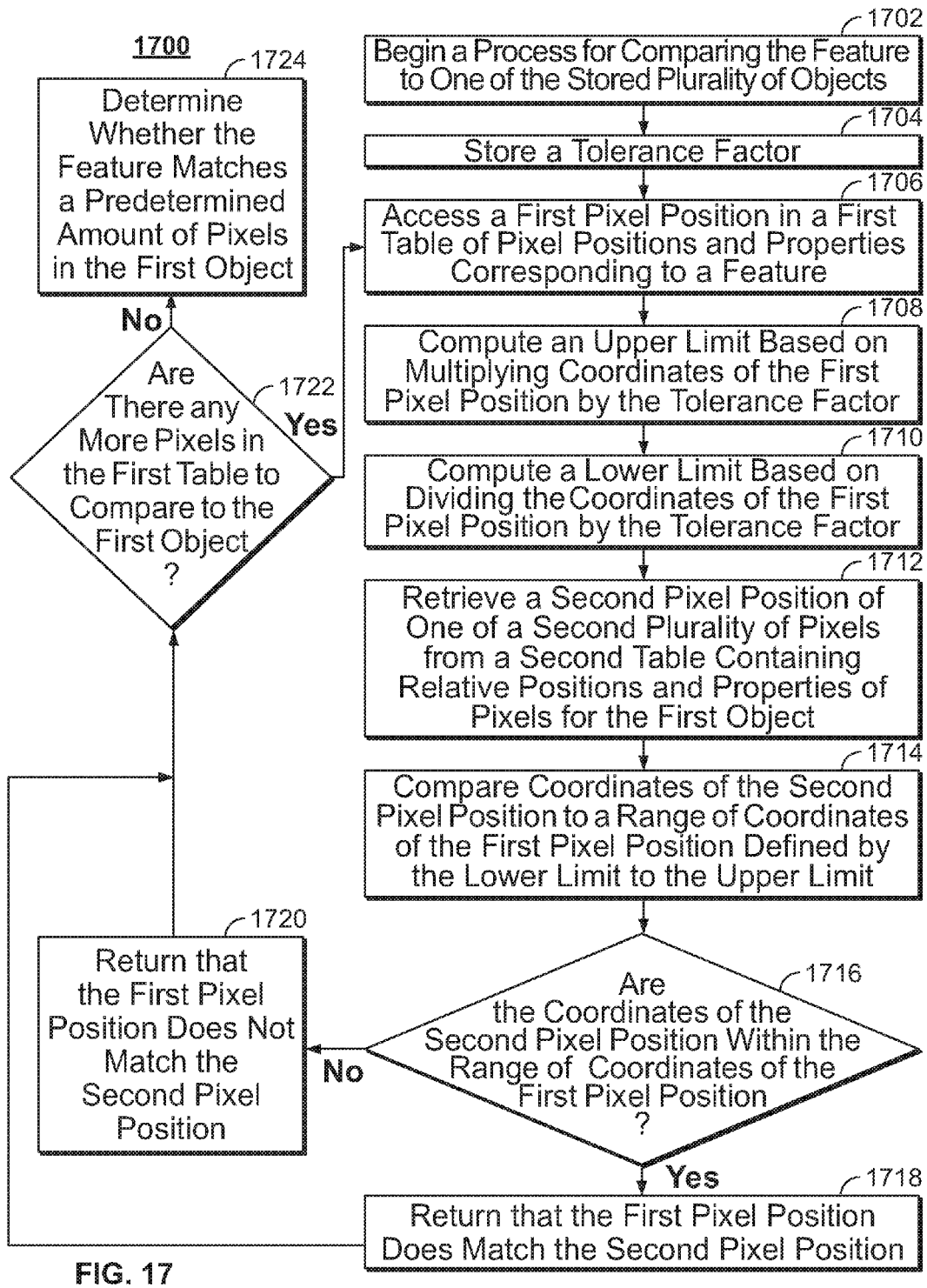
FIG. 17 is a flowchart of illustrative steps for comparing the feature to one of the stored plurality of objects in accordance with some embodiments of the disclosure.

FIG. 17 is a flowchart of illustrative steps for comparing the feature to one of the stored plurality of objects in accordance with some embodiments of the disclosure. Process 1700 may be used to determine an object that corresponds to a detected feature. It should be noted that process 1700 or any step thereof, could occur on, or be provided by, any of the devices shown in FIGS. 12-13. For example, process 1700 may be executed by control circuitry 1204 as instructed by the media guidance application (e.g., implemented on any of the devices shown and described in FIG. 13).

Process 1700 begins at 1702, where the media guidance application may store a plurality of objects (e.g., including object 302). The media guidance application defines the feature or features representative of the object (e.g., object 302) by a first table containing relative positions and properties of a first plurality of pixels (e.g., as described in FIG. 2). The media guidance application may store in a pixel coordinates field (e.g., pixel coordinates field 304) of the data structure corresponding to the object (e.g., object 302) a pointer to a table containing the pixel coordinates for the object (e.g., object 302), or the field may contain a two-dimensional array, list, or other data structure appropriate for containing the (x,y) plane relative pixel coordinates. For example, the media guidance application may store coordinates and properties for every pixel in separate rows of a table (e.g., as described in FIG. 2).

Process 1700 may continue to 1704, where the media guidance application may store a tolerance factor. The tolerance factor may define how closely the properties of the feature detected need to match the properties of the object (e.g., object 302) stored in the database (e.g., database 300) in order for a match to be returned. For example, the media guidance application may store a tolerance factor of 1, which may mean the properties must match exactly. Alternatively, the media guidance application may store a tolerance factor of 30, which may mean the properties do not need to be very close to return a match.

Process 1700 may continue to 1706, where the media guidance application may access a first pixel position in a first table of pixel positions and properties corresponding to a feature. For example, the media guidance application may retrieve the coordinates of the first pixel position from the first table by executing a database query language script, such as SQL, utilizing the declarative "Select" command to access data in a particular table or expression. For instance, the media guidance application may retrieve (5,10) as the relative coordinates of a first pixel in the (x,y) plane.

Process 1700 may continue to 1708, where the media guidance application may compute an upper limit based on multiplying coordinates of the first pixel position by the tolerance factor. For example, for a tolerance factor of 2, the media guidance application may compute the upper limit for the coordinates (5,10) to be (10,20).

Process 1700 may continue to 1710, where the media guidance application may compute a lower limit based on dividing the coordinates of the first pixel position by the tolerance factor. For example, for a tolerance factor of 2, the media guidance application may compute the lower limit for the coordinates (5,10) to be (2.5,5).

Process 1700 may continue to 1712, where the media guidance application may retrieve a second pixel position of one of a second plurality of pixels from a second table containing relative positions and properties of pixels for the first object. For example, as described above for the feature, the media guidance application may retrieve the coordinates of the second pixel position from the second table (e.g., either contained or pointed to by pixel coordinates field 304). For instance, the media guidance application may retrieve (4,7) as the relative coordinates of a pixel in the (x,y) plane.

Process 1700 may continue to 1714, where the media guidance application may compare coordinates of the second pixel position to a range of coordinates of the first pixel position defined by the lower limit to the upper limit. For example, the media guidance application may compare the range of the first pixel position coordinates defined based on the lower and upper limits (2.5-10,5-20) to the second pixel coordinates (4,7).

Process 1700 may continue to 1716, where the media guidance application determines whether the coordinates of the second pixel position are within the range of coordinates of the first pixel position. For example, the media guidance application would find (4,7) to be within the range (2.5-10, 5-20). If the coordinates of the second pixel position are within the range, process 1700 may proceed to 1718, where the media guidance application may return that the first pixel position does match the second pixel position. If the coordinates of the second pixel position are not within the range, process 1700 may proceed to 1720, where the media guidance application may return that the first pixel position does not match the second pixel position.

Process 1700 may continue to 1722, where the media guidance application may determine whether there are any more pixels in the first table to compare to the first object. For example, the media guidance application may maintain a data structure, such as an array, of pixels in the first table the media guidance application has analyzed and compared to pixels in the second table. By comparing the pixels stored in the array with those in the first table, the media guidance application may determine whether every pixel in the first table has been analyzed. If not every pixel has been analyzed, process 1700 may return to 1706 and analyze a pixel position of a new pixel that has not been previously analyzed.

If every pixel has been analyzed, process 1700 may continue to 1724, where the media guidance application may determine whether the feature matches a predetermined amount of pixels in the first object. For example, the media guidance application may store a predefined number or percentage of pixels that need to match for a feature to be determined to match the object (e.g., object 302), such as 85% of the pixels must match. For example, if a feature is defined by a table containing 100 pixels and the media guidance application determined 90 of the 100 pixels match an object also containing 100 pixels, the media guidance application may determine that the feature matches the object (e.g., object 302) since greater than the predefined percentage of pixels matched. If the media guidance application determines the feature matches the first object, process 1700 may return that the feature matches the first object.

If the media guidance application determines the feature does not match the first object, the media guidance application may determine whether any other objects match the feature. For example, process 1700 may be followed by the media guidance application for every object stored in a database of objects to determine whether the feature matches any of the objects stored in memory (e.g., storage 1208 or at a remote server accessible via communications network 1314).

Figure 18:
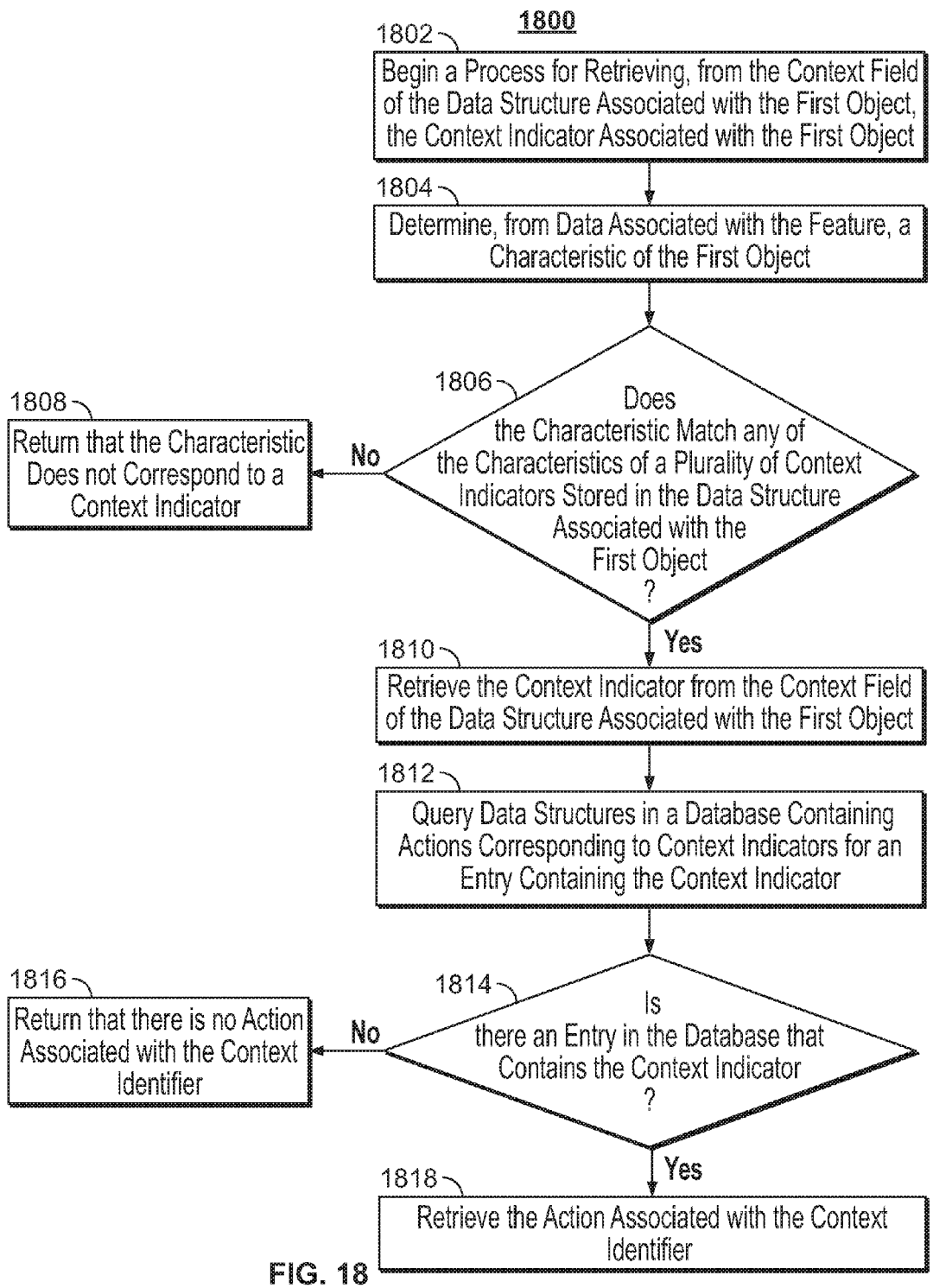
FIG. 18 is a flowchart of illustrative steps for determining an action to perform based on a retrieved context indicator in accordance with some embodiments of the disclosure.

FIG. 18 is a flowchart of illustrative steps for determining an action to perform based on a retrieved context indicator in accordance with some embodiments of the disclosure. Process 1800 may be used to determine the action the media guidance application should take in response to detecting an object. It should be noted that process 1800 or any step thereof, could occur on, or be provided by, any of the devices shown in FIGS. 12-13. For example, process 1800 may be executed by control circuitry 1204 as instructed by the media guidance application (e.g., implemented on any of the devices shown and described in FIG. 13).

Process 1800 begins at 1802, where the media guidance application may retrieve, from the context field of the data structure associated with the first object, the context indicator associated with the first object. For example, the media guidance application may store "$1^{st}+10$" and "$4^{th}+30$" as particular context indicators for the object (e.g., object 302) in context fields (e.g., contexts 308) in a data structure (e.g., a column in a table as described in FIG. 3) associated with the object (e.g., object 302). The media guidance application may retrieve one of these context indicators based on the steps of process 1800.

Process 1800 may continue to 1804, where the media guidance application may determine, from data associated with the feature, a characteristic of the first object. The media guidance application may determine the characteristic by analyzing the pixel map associated with the feature for additional data corresponding to a characteristic of the feature. For example, the media guidance application may determine that the frame containing the object additionally contains a characteristic either of the object itself or related to the object. For instance, an object (e.g., object 302) detected during a football game may be different colors in different situations or the frame may contain text directly indicating the context.

Process 1800 may continue to 1806, where the media guidance application may determine whether the characteristic matches any of the characteristics of a plurality of context indicators stored in the data structure associated with the first object. For example, the media guidance application may iterate through each of the context indicators in the column (e.g., contexts 308 as described in FIG. 3) corresponding to the object and determine whether the detected characteristic matches a characteristic of the particular context indicator. For example, the media guidance application may compare the color of the detected object (e.g., object 302) to colors associated with different context indicators in contexts 308.

If the media guidance application determines the characteristic does not match any of the characteristics of a plurality of context indicators, process 1800 may continue to 1808, where the media guidance application may return that the characteristic does not correspond to a context indicator.

If the media guidance application determines the characteristic does match a characteristic, process 1800 may continue to 1810, where the media guidance application may retrieve the context indicator from the context field of the data structure associated with the first object. For example, upon comparing a red arrow that was detected to color characteristics of the "Down and Distance Arrow" object, (e.g., object 302) corresponding to different context indicators, the media guidance application may determine the red arrow corresponds to a context indicator "$4^{th}$ down" and retrieve the context indicator from the appropriate field of contexts 308.

Process 1800 may continue to 1812, where the media guidance application may query data structures in a database containing actions corresponding to context indicators for an entry containing the context indicator. The media guidance application may access a database containing actions corresponding to context indicators. The media guidance application may then query the data structures in the database for a data structure that contains the retrieved context indicator. For example, the media guidance application may, by executing a database query language script such as SQL utilizing the declarative "Select" command, access data in a particular table or expression containing a context identifier.

Process 1800 may continue to 1814 where the media guidance application may determine whether there is an entry in the database the contains the context indicator. For example, after comparing each context indicator retrieved in step 1812 to the context indicator corresponding to the object, the media guidance application may determine based on comparing identifiers of the indicator whether the context indicators match. For example, an identifier of a context indicator associated with the object may be the string of characters, "Down and Distance Arrow."

If there is not an entry in the database that contains the context indicator, then process 1800 may proceed to 1816, where the media guidance application may return that there is no action associated with the context identifier. In this case, the media guidance application will not perform an action with respect to an object appearing in the media asset.

If there is an entry in the database that contains the context indicator, then process 1800 may proceed to 1818, where the media guidance application may retrieve the action associated with the context indicator. If the media guidance application retrieves from an entry in the database containing actions associated with context indicators the context indicator, "Down and Distance Arrow," the media guidance application may determine that the context indicator in an entry in the database matches the context indicator associated with the object. The media guidance application may then access the data structure in the database containing the entry with the matching identifier and retrieve an action. The retrieved action may be an executable script which may be executed by the media guidance application, or a pointer to an executable script in a different location in memory (e.g., storage 1208).

Figure 19:
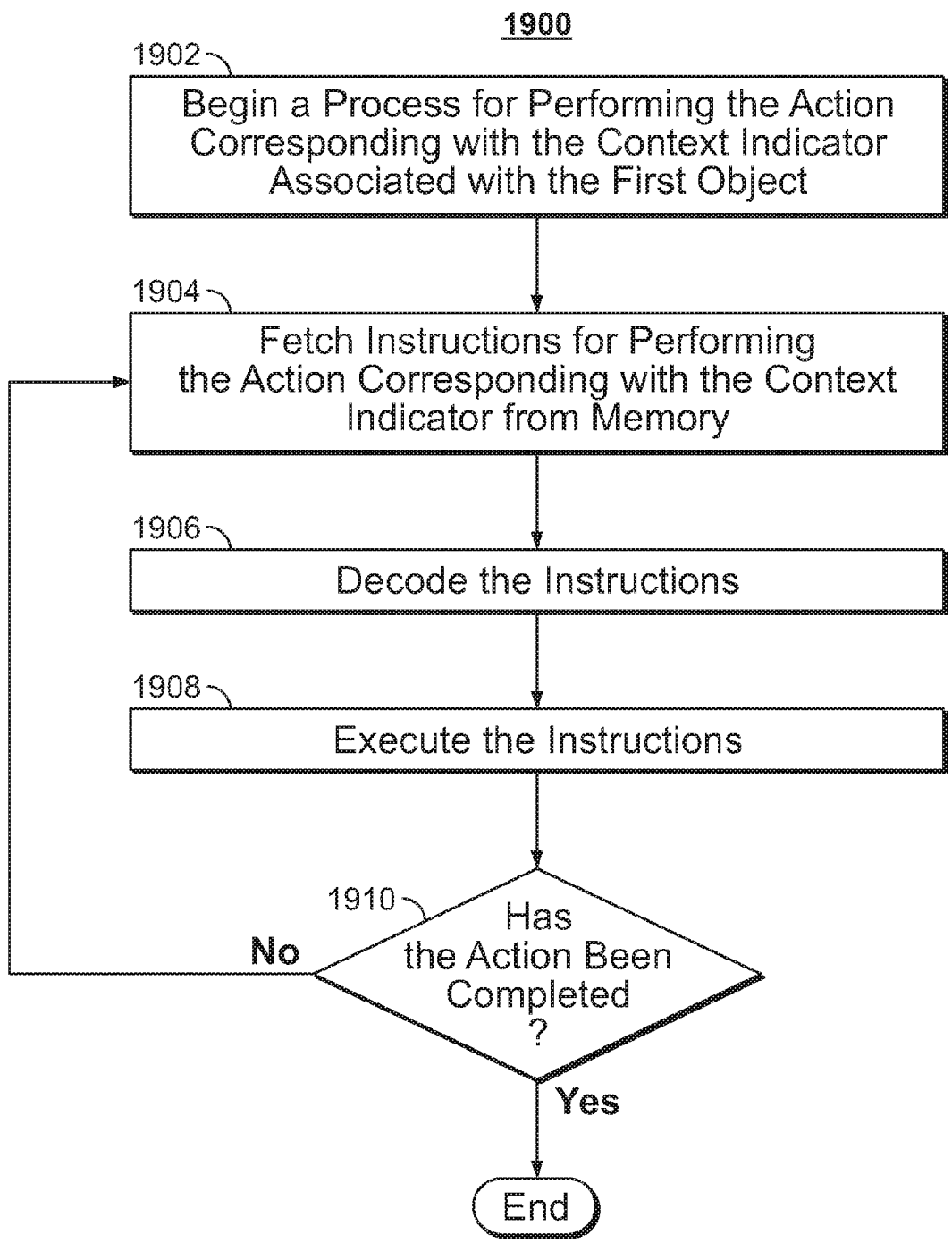
FIG. 19 is a flowchart of illustrative steps for performing the action corresponding with the context indicator associated with the first object in accordance with some embodiments of the disclosure.

FIG. 19 is a flowchart of illustrative steps for performing the action corresponding with the context indicator associated with the first object in accordance with some embodiments of the disclosure. It should be noted that process 1900 or any step thereof, could occur on, or be provided by, any of the devices shown in FIGS. 12-13. For example, process 1900 may be executed by control circuitry 1204 as instructed by the media guidance application (e.g., implemented on any of the devices shown and described in FIG. 13).

Process 1900 begins at 1902, where the media guidance application may perform the action corresponding with the context indicator associated with the first object. For example, upon retrieving that the action associated with "$1^{st}+10$" is to move to that playback point, the media guidance application may execute a script to move to the playback point of the object (e.g., arrow 104) with the context indicator, "$1^{st}+10$," (e.g., context indicator 106).t Process 1900 may continue to 1904, where the media guidance application may fetch instructions for performing the action corresponding with the context indicator from memory (e.g., storage 1208). For example, the instructions could be an executable script such as a script in an object-oriented programming language like C++. Control circuitry 1204 executing the media guidance application may fetch the script from the database containing actions corresponding to objects, or from a location pointed to by a pointer in the action field associated with the context indicator.

Process 1900 may continue to 1906, where the media guidance application may decode the instructions. For example, if the instructions are in an object-oriented script in a language like C++, control circuitry 1204 may compile the code so that the code may be executed by control circuitry 1204.

Process 1900 may continue to 1908, where the media guidance application may execute the instructions. For example, control circuitry 1204 may perform operations based on the decoded instructions. For instance, the decoded instructions may instruct control circuitry 1204 to retrieve a frame of a media asset from a buffer.

Process 1900 may continue to 1910, where the media guidance application determines whether the action has been completed. For example, the action may be to retrieve one specific frame, in which case after the frame has been retrieved the process may end. If the media guidance application determines that the action has not been completed, process 1900 may return to 1904. For example, if the action requires multiple loops through the script, perhaps if the code is recursive, the media guidance application may determine the action has not been completed and returns to step 1904.

Figure 20:
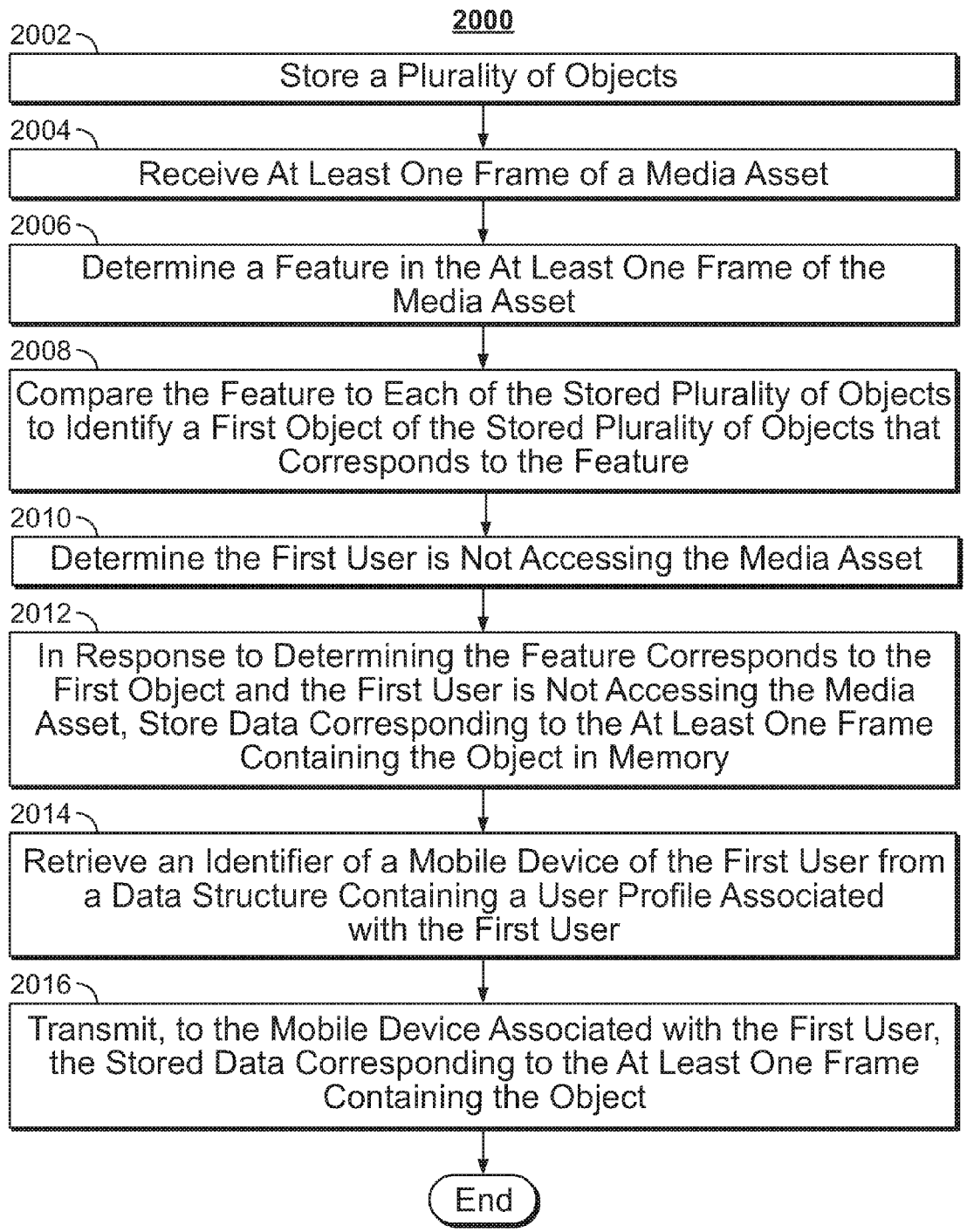
FIG. 20 is a flowchart of illustrative steps for transmitting a portion of a media asset containing an object to a first user in accordance with some embodiments of the disclosure.

FIG. 20 is a flowchart of illustrative steps for transmitting a portion of a media asset containing an object to a first user in accordance with some embodiments of the disclosure. It should be noted that process 2000 or any step thereof, could occur on, or be provided by, any of the devices shown in FIGS. 12-13. For example, process 2000 may be executed by control circuitry 1204 as instructed by the media guidance application (e.g., implemented on any of the devices shown and described in FIG. 13).

Process 2000 begins at 2002, where the media guidance application may store a plurality of objects. For example, the media guidance application may maintain a database stored in memory (e.g., storage 1208) of objects containing information about media assets they commonly apply to, contexts where the objects appear, and properties of the objects. For example, the media guidance application may organize the objects into a table where each column describes properties of an object, as described in detail in FIG. 3.

Process 2000 may continue to 2004, where the media guidance application may receive at least one frame of a media asset. For example, the media guidance application may record an entire football game in memory (e.g., storage 1208) and examine each of the frames of the game for an object. Alternatively, the media guidance application may examine the frames of live programming for objects as the frames are received. For example, the media guidance application may examine each frame as the frame is presented on a display (e.g., display 1212) for objects. Alternatively, the media guidance application may store a buffer of live programming such that a number of frames before the currently displayed frame, after the currently displayed frame, or both, are analyzed to determine if any of the frames contain objects. For example, the media guidance application may maintain a buffer of ten frames in memory (e.g., storage 1208), such that a display (e.g., display 1212) displays the eleventh most recently received frame and the ten more recently received frames are analyzed by the media guidance application for objects.

Process 2000 may continue to 2006, where the media guidance application may determine a feature in the at least one frame of the media asset. For example, the media guidance application may determine that a feature, (e.g., feature 104) is present in the at least one frame of the media asset (e.g., media asset 102). In some embodiments, the media guidance application may determine the feature by examining the patterns of particular subsets of pixels in the at least one frame of the media asset (e.g., media asset 102), as described further in FIG. 16. In other embodiments, the media guidance application may determine the feature by analyzing patterns in the waveform of an audio track. For example, the media guidance application may determine that the appearance of particular frequencies that appear in a repeated pattern in the media asset (e.g., media asset 102) corresponds to a feature. The media guidance application may store the patterns associated with features in memory (e.g., storage 1208).

Process 2000 may continue to 2008, where the media guidance application may compare the feature to each of the stored plurality of objects to identify a first object of the stored plurality of objects that corresponds to the feature. For example, in response to determining that the at least one frame contains a feature (e.g., arrow feature 104), the media guidance application may compare the properties of the feature (e.g., arrow feature 104) with the properties of objects stored in memory (e.g., storage 1208). The media guidance application may compare the feature to objects based on the genre, channel, or other commonalities of media assets for which the media guidance application has defined a library of objects, as described further in FIG. 17. The media guidance application may then determine whether the feature (e.g., arrow feature 104) corresponds to the arrow object stored in memory (e.g., storage 1208).

Process 2000 may continue to 2010, where the media guidance application may determine the first user is not accessing the media asset. For example, the media guidance application may determine that all of the user equipment devices associated with the first user are either powered down or tuned to a different media asset, as described further in FIG. 21.

Process 2000 may continue to 2012, where the media guidance application may, in response to determining the feature corresponds to the first object and the first user is not accessing the media asset, store data corresponding to the at least one frame containing the object in memory (e.g., storage 1208). For example, the media guidance application may store a screenshot of the at least one frame containing the object. As another example, the media guidance application may store a portion of the media asset containing the object. As another example, the media guidance application may store a detailed description or media asset listing associated with the object. The media guidance application may determine what data to store based on the data structure associated with the object (e.g., the column of a table as described in FIG. 3). For example, the media guidance application may store in a field of the data structure associated with the object (e.g., other properties 306) that if the first user is not watching the media asset in which the object is detected, to store certain data and transmit the data to the first user, as described further in FIG. 22.

Process 2000 may continue to 2014, where the media guidance application may retrieve an identifier of a mobile device (e.g., wireless user communications device 1306) of the first user from a data structure containing a user profile associated with the first user. For example, the media guidance application may retrieve an identifier of a mobile phone, such as telephone number of the mobile phone, associated with the first user, as described further in FIG. 23.

Process 2000 may continue to 2016, where the media guidance application may transmit, to the mobile device (e.g., wireless user communications device 1306) associated with the first user, the stored data corresponding to the at least one frame containing the object. For example, the media guidance application may transmit a text message to the first user's mobile phone containing the stored data, or alternatively, a link to the stored data, as described further in FIG. 24.

Figure 21:
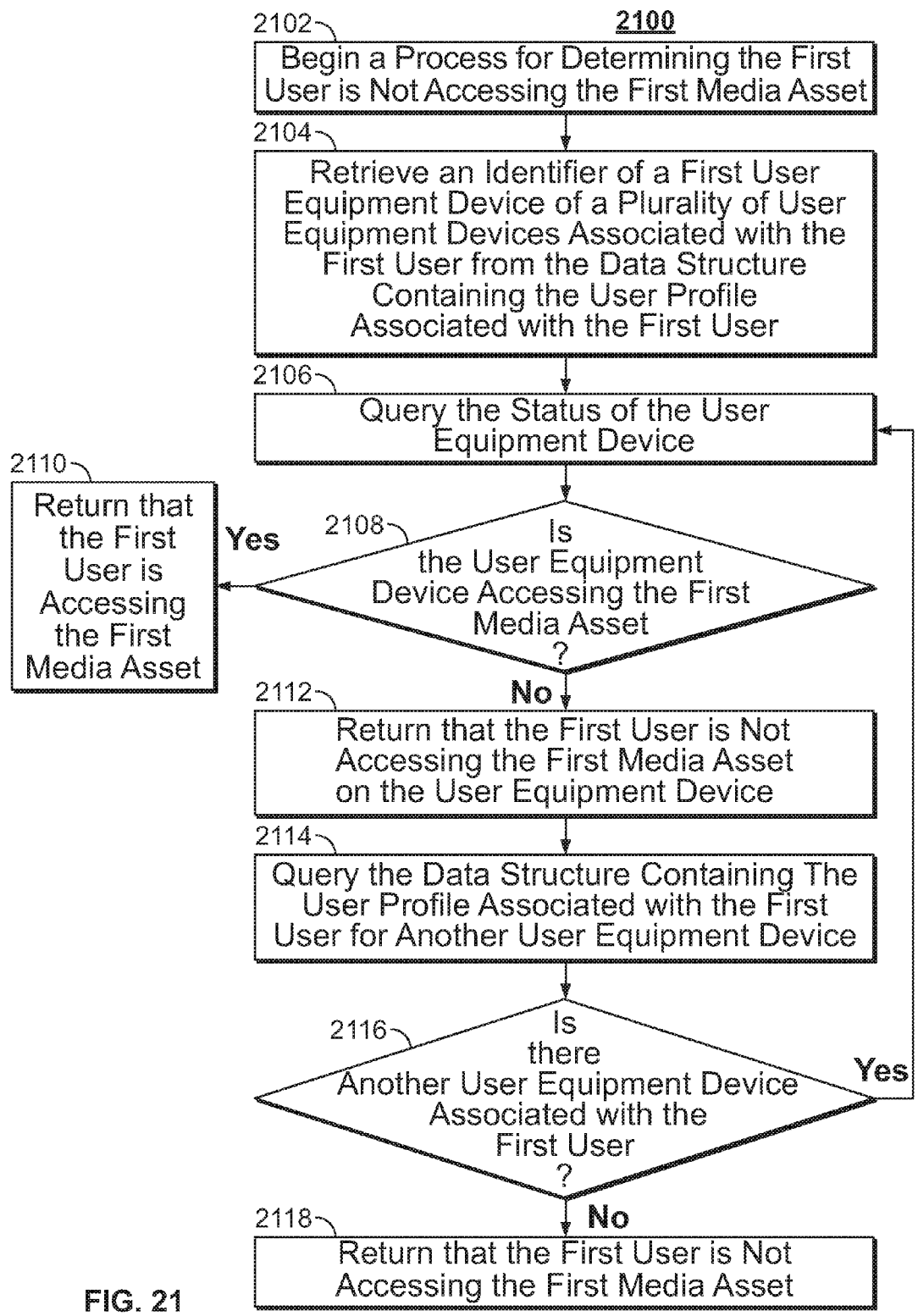
FIG. 21 is a flowchart of illustrative steps for determining the first user is not accessing the first media asset in accordance with some embodiments of the disclosure.

FIG. 21 is a flowchart of illustrative steps for determining the first user is not accessing the first media asset in accordance with some embodiments of the disclosure. It should be noted that process 2100 or any step thereof, could occur on, or be provided by, any of the devices shown in FIGS. 12-13. For example, process 2100 may be executed by control circuitry 1204 as instructed by the media guidance application (e.g., implemented on any of the devices shown and described in FIG. 13).

Process 2100 begins at 2102, where the media guidance application may begin a process for determining the first user is not accessing the first media asset. For example, the media guidance application may determine that all of the user equipment devices associated with the first user are either powered down or tuned to a different media asset.

Process 2100 may continue to 2104, where the media guidance application may retrieve an identifier of a first user equipment device of a plurality of user equipment devices associated with the first user from the data structure containing the user profile associated with the first user. For example, the media guidance application may query entries in the data structure containing the user profile of the first user and determine there are two set-top boxes connected to televisions associated with the user's account. Further, the media guidance application may then retrieve an identifier of one of the set-top boxes.

Process 2100 may continue to 2106, where the media guidance application may query the status of the user equipment device. For example, the media guidance application may transmit a message to the set-top box to query the status of tuners contained in the set-top box.

Process 2100 may continue to 2108, where the media guidance application may determine whether the user equipment device is accessing the first media asset. For example, the media guidance application may determine, from the status of tuners, the first user equipment device is not accessing the media asset. For example, the media guidance application may determine that since each tuner of a set-top box is tuned to a different program, the set-top box is not accessing the media asset. If the user equipment device is accessing the first media asset, then process 2100 may continue to 2110, where the media guidance application may return that the first user is accessing the first media asset.

If the user equipment device is not accessing the first media asset, then process 2100 may continue to 2112, where the media guidance application may return that the first user is not accessing the first media asset on the user equipment device. For example, the media guidance application may store in an array as a Boolean set to true paired with an identifier of the user equipment device that the user equipment device is not accessing the media asset.

Process 2100 may continue to 2114, where the media guidance application may query the data structure containing the user profile associated with the first user for another user equipment device. For example, the media guidance application may query entries in the data structure containing the user profile of the first user and determine there are two set-top boxes connected to televisions associated with the user's account.

Process 2100 may continue to 2116, where the media guidance application may determine whether there is another user equipment device associated with the first user. The media guidance application may compare the identifiers of the two set-top boxes with identifiers stored in the array containing information about whether the user equipment devices are accessing the first media asset. The media guidance application may then determine whether every user equipment device associated with the user has been checked to see if the user equipment device is accessing the first media.

If there is not another user equipment device, then process 2100 may continue to 2118, where the media guidance application may return that the first user is not accessing the media asset. If there is another user equipment device, process 2100 may return to 2106 and determine whether that user equipment device is accessing the first media asset.

Figure 22:
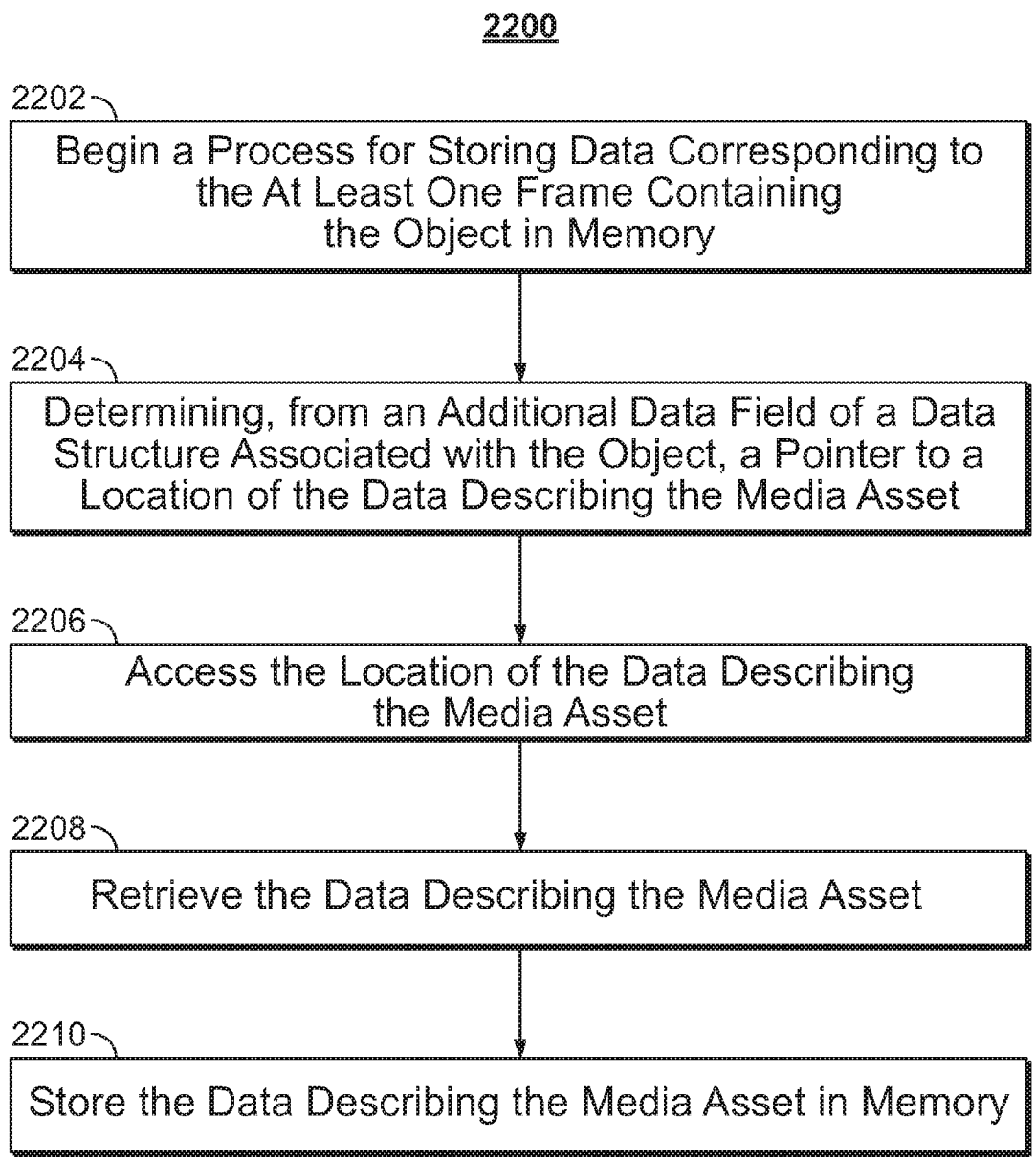
FIG. 22 is a flowchart of illustrative steps for storing data corresponding to the at least one frame containing the object in memory in accordance with some embodiments of the disclosure.

FIG. 22 is a flowchart of illustrative steps for storing data corresponding to the at least one frame containing the object in memory (e.g., storage 1208) in accordance with some embodiments of the disclosure. It should be noted that process 2200 or any step thereof, could occur on, or be provided by, any of the devices shown in FIGS. 12-13. For example, process 2200 may be executed by control circuitry 1204 as instructed by the media guidance application (e.g., implemented on any of the devices shown and described in FIG. 13).

Process 2200 begins at 2202, where the media guidance application may begin a process for storing data corresponding to the at least one frame containing the object in memory (e.g., storage 1208). For example, the media guidance application may store a screenshot of the at least one frame containing the object. As another example, the media guidance application may store a portion of the media asset containing the object. As another example, the media guidance application may store a detailed description or media asset listing associated with the object.

Process 2200 may continue to 2204, where the media guidance application may determine, from an additional data field of a data structure associated with the object, a pointer to a location of the data describing a media asset (e.g., media asset 904). For example, the media guidance application may determine from the data structure of the object (e.g., object 906) a pointer that points to media guidance data source 1318 containing a description of the media asset (e.g., media asset 904), such as the location of a football game and the records of both teams. As another example, the pointer may point to a location in memory (e.g., storage 1208) of a buffer stream for the media asset.

Process 2200 may continue to 2206, where the media guidance application may access the location of the data describing the media asset. For example, the media guidance application may access data in a buffer stream stored in storage 1208 or data stored at media guidance data source 1318.

Process 2200 may continue to 2208, where the media guidance application may retrieve the data describing the media asset. For example, the media guidance application may retrieve frames of the media asset from the buffer stream stored in storage 1208. As another example, the media guidance application may retrieve supplemental information relating to the media asset, such as a detailed description, from media guidance data source 1318.

Process 2200 may continue to 2210, where the media guidance application may store the data describing the media asset in memory (e.g., storage 1208). For example, after retrieving the data, the media guidance application may store in memory (e.g., storage 1208) the retrieved data.

Figure 23:
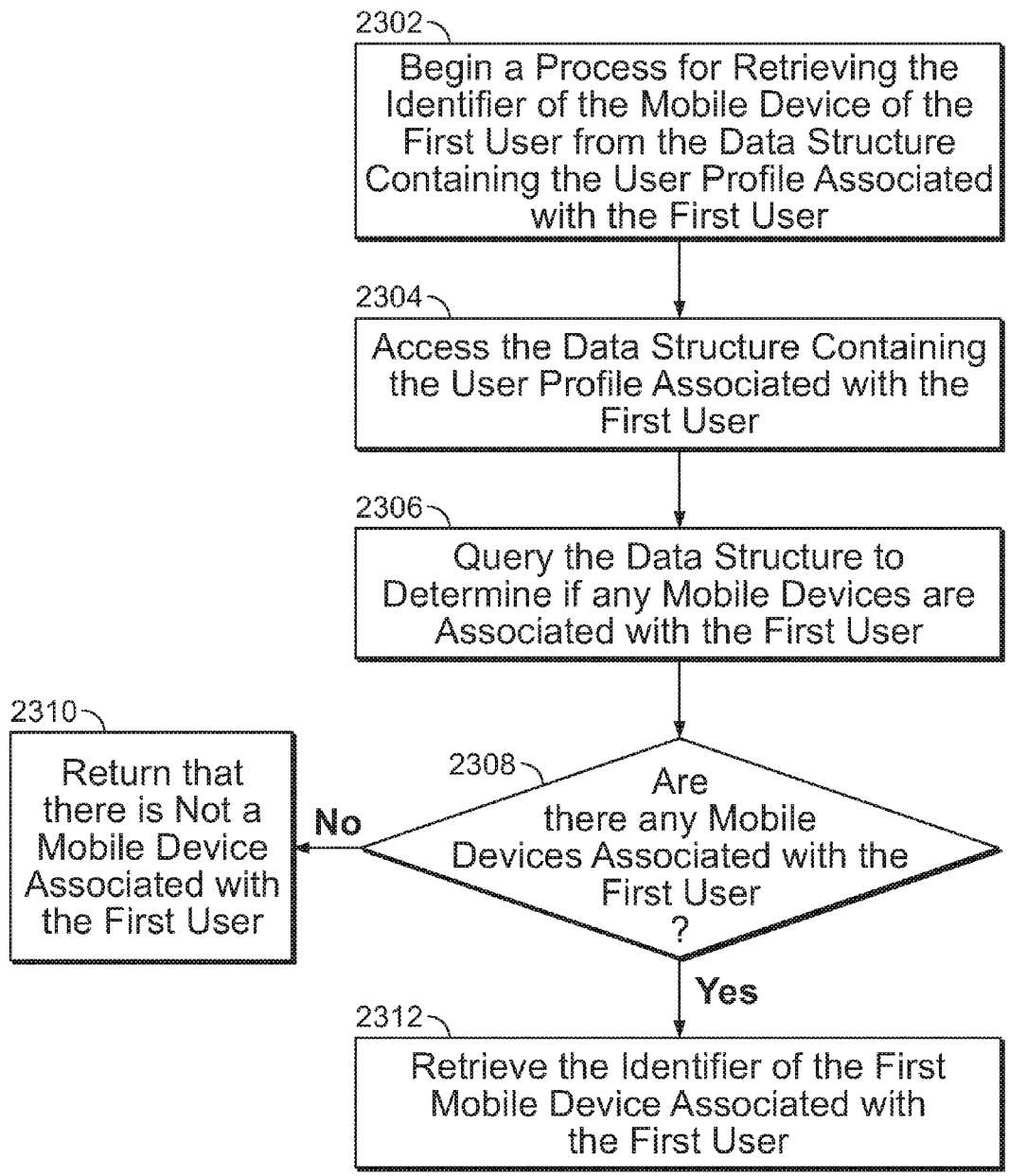
FIG. 23 is a flowchart of illustrative steps for retrieving the identifier of the mobile device of the first user from the data structure containing the user profile associated with the first user in accordance with some embodiments of the disclosure.

FIG. 23 is a flowchart of illustrative steps for retrieving the identifier of the mobile device (e.g., wireless user communications device 1306) of the first user from the data structure containing the user profile associated with the first user in accordance with some embodiments of the disclosure. It should be noted that process 2300 or any step thereof, could occur on, or be provided by, any of the devices shown in FIGS. 12-13. For example, process 2300 may be executed by control circuitry 1204 as instructed by the media guidance application (e.g., implemented on any of the devices shown and described in FIG. 13).

Process 2300 begins at 2302, where the media guidance application may begin a process for retrieving the identifier of the mobile device (e.g., wireless user communications device 1306) of the first user from the data structure containing the user profile associated with the first user. For example, the media guidance application may retrieve an identifier of a mobile phone, such as telephone number of the mobile phone, associated with the first user.

Process 2300 may continue to 2304, where the media guidance application may access the data structure containing the user profile associated with the first user. For example, the media guidance application may query a database of user profiles for a data structure corresponding for a user profile with an identifier corresponding to the user.

Process 2300 may continue to 2306, where the media guidance application may query the data structure to determine if any mobile devices (e.g., wireless user communications device 1306) are associated with the first user. For example, the mobile devices may be indicated by a "mobile device" flag set to true among a plurality of user equipment devices. Alternatively, the mobile devices may be stored in a separate entry from non-mobile user equipment devices in the data structure corresponding to a profile of the first user. The media guidance application may query the user equipment entries in the data structure to determine if a mobile device is associated with the first user.

Process 2300 may continue to 2308, where the media guidance application may determine if there are any mobile devices (e.g., wireless user communications device 1306) associated with the first user. If there are not any mobile devices, then process 2300 may continue to 2310, where the media guidance application may return that there is not a mobile device associated with the first user. If there is a mobile device associated with the first user, then process 2300 may continue to 2312, where the media guidance application may retrieve the identifier of the first mobile device associated with the first user. For example, the media guidance application may retrieve the identifier by executing a database query language script, such as an SQL script, utilizing the declarative "Select" command to access data in a particular table or expression.

Figure 24:
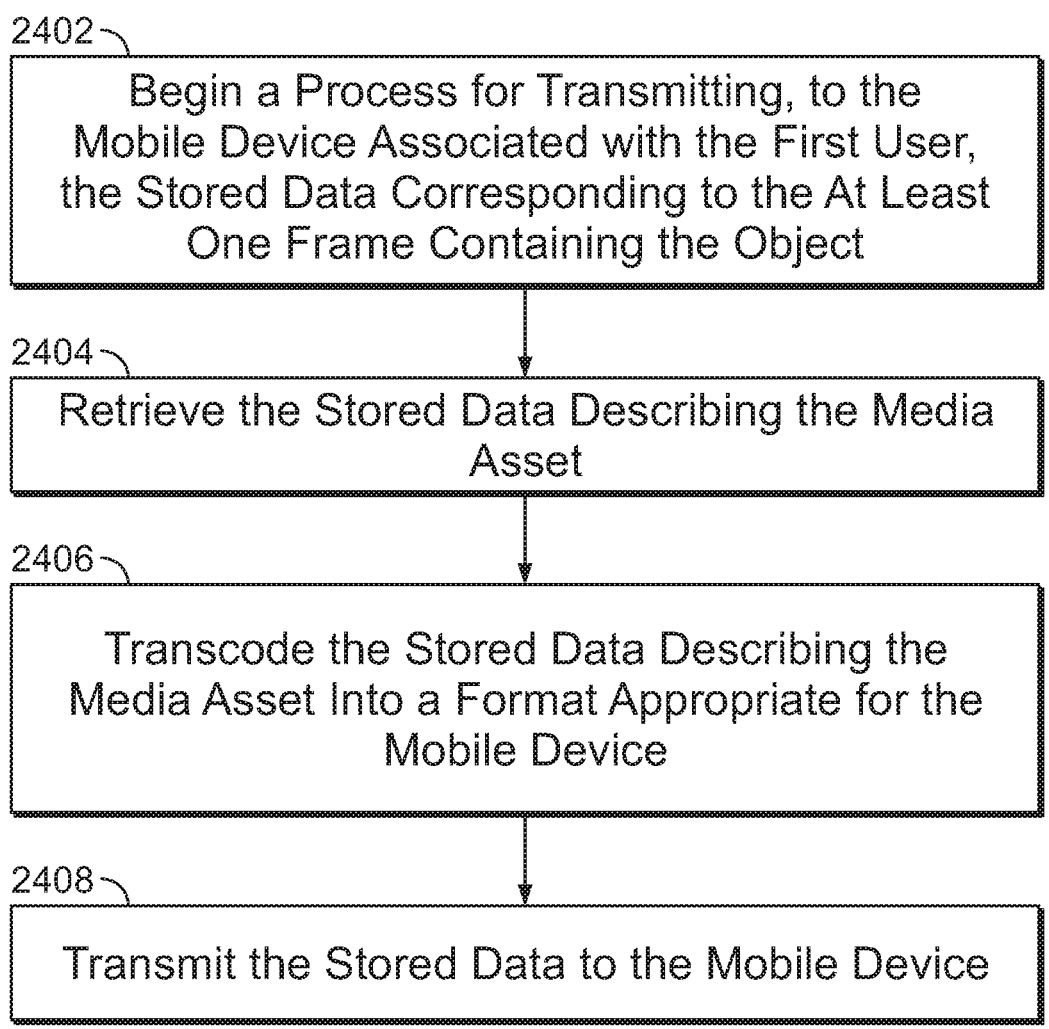
FIG. 24 is a flowchart of illustrative steps for transmitting, to the mobile device associated with the first user, the stored data corresponding to the at least one frame containing the object in accordance with some embodiments of the disclosure.

FIG. 24 is a flowchart of illustrative steps for transmitting, to the mobile device (e.g., wireless user communications device 1306) associated with the first user, the stored data corresponding to the at least one frame containing the object in accordance with some embodiments of the disclosure. It should be noted that process 2400 or any step thereof, could occur on, or be provided by, any of the devices shown in FIGS. 12-13. For example, process 2400 may be executed by control circuitry 1204 as instructed by the media guidance application (e.g., implemented on any of the devices shown and described in FIG. 13).

Process 2400 begins at 2402, where the media guidance application may begin a process for transmitting, to the mobile device (e.g., wireless user communications device 1306) associated with the first user, the stored data corresponding to the at least one frame containing the object. Process 2400 may continue to 2404, where the media guidance application may retrieve the stored data describing the media asset. For example, the media guidance application may access the location of the stored data in memory (e.g., storage 1208) and retrieve the data.

Process 2400 may continue to 2406, where the media guidance application may transcode the stored data describing the media asset into a format appropriate for the mobile device (e.g., wireless user communications device 1306). For example, the media guidance application may determine from the data structure associated with the user profile for the first user a preferred file format for the mobile device to receive data stored in the entry with the mobile device. For example, the media guidance application may access an entry of a mobile device, "Tom's mobile phone," which may contain the preferred video file format, "MPEG-4," in addition to the identifier "123-456-789." In response, the media guidance application may execute a script to transcode the stored data into the preferred file format.

Process 2400 may continue to 2408, where the media guidance application may transmit the stored data to the mobile device. For example, the media guidance application may transmit a highlight of a football game to "Tom's mobile phone" as an attachment or embedded in a message.

It is contemplated that the steps or descriptions of each of FIGS. 14-24 may be used with any other embodiment of this disclosure. In addition, the steps and descriptions described in relation to FIGS. 14-24 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-13 could be used to perform one or more of the steps in FIGS. 14-24.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for performing an action based on context of a feature in a media asset, the method comprising:
   storing a plurality of objects;
   storing, in a context field of a data structure associated with a first object of the plurality of objects, a first context indicator, wherein progress towards a goal in a sporting event being close to the goal is stored as a first characteristic of the first context indicator;
storing, in the context field of the data structure associated with the first object of the plurality of objects, a second context indicator, wherein progress towards the goal in the sporting event being far from the goal is stored as a second characteristic of the second context indicator;
receiving at least one frame of the media asset;
determining a feature in the at least one frame of the media asset;
comparing the feature to each of the stored plurality of objects to identify the first object of the stored plurality of objects that corresponds to the feature;
retrieving, from the context field of the data structure associated with the first object, a context indicator associated with the first object by:
 determining, from data associated with the feature, a characteristic of the first object;
 comparing the characteristic to the first and second characteristics of the first and second context indicators stored in the data structure associated with the first object to identify the first context indicator that corresponds to the characteristic; and
 retrieving, as the context indicator associated with the first object, the first context indicator from the context field of the data structure associated with the first object;
retrieving from a database of actions corresponding to context indicators an action corresponding to the context indicator associated with the first object; and
performing the action corresponding to the context indicator associated with the first object.

2. The method of claim 1, wherein storing the plurality of objects comprises:
creating the feature;
associating the created feature with a plurality of media assets, wherein the plurality of media assets contain similar content;
storing the created feature as the first object in a library of objects associated with the plurality of media assets; and
generating an overlay with the first object on the media asset.

3. The method of claim 1, wherein determining the feature comprises:
analyzing a pixel map associated with the at least one frame of the media asset;
analyzing a group of pixels in the pixel map;
determining shared properties of a subset of pixels in the group of pixels; and
generating a table for the feature containing relative positions and properties of pixels in the subset of pixels.

4. The method of claim 1, wherein the feature is defined by a first table containing relative positions and properties of a first plurality of pixels, and wherein comparing the feature to each of the stored plurality of objects comprises:
storing a tolerance factor;
accessing a first pixel position of a first pixel stored in the first table;
computing an upper limit based on multiplying coordinates of the first pixel position by the tolerance factor;
computing a lower limit based on dividing the coordinates of the first pixel position by the tolerance factor;
retrieving a second pixel position of one of a second plurality of pixels from a second table containing relative positions and properties of pixels for the first object;
comparing coordinates of the second pixel position to a range of coordinates of the first pixel position defined by the lower limit to the upper limit;
determining the first pixel position matches the second pixel position when the coordinates of the second pixel position is within the range of coordinates of the first pixel position; and
in response to determining a predetermined number of the pixel positions corresponding to the first plurality of pixels in the first table match one of a plurality of pixel positions in the second table, determining the feature corresponds to the first object.

5. The method of claim 1, wherein the action associated with the context indicator relates to moving a current playback position to another playback position that includes the object, and wherein performing the action comprises:
determining the another playback position based on the at least one frame containing the object;
moving the current playback position to the another playback position; and
playing the media asset from the another playback position.

6. The method of claim 1, wherein the action associated with the context indicator relates to alerting a user to a media asset listing with subject matter that corresponds to the first object, and wherein performing the action comprises:
retrieving subject matter of the first object from a subject matter field of the data structure associated with the first object;
searching for a first media asset listing associated with the retrieved subject matter; and
promoting the first media asset listing among a plurality of displayed media asset listings.

7. The method of claim 1, wherein the action associated with the context indicator relates to presenting supplemental information related to the object, and wherein performing the action comprises:
retrieving a pointer to a location of the supplemental information related to the object from a supplemental information field of the data structure associated with the object;
accessing the location of the supplemental information;
retrieving the supplemental information; and
generating a simultaneous display of the media asset and the supplemental information.

8. The method of claim 1, wherein the media asset is a first media asset, wherein the action is associated with presenting the first media asset to the user simultaneously with a second media asset currently being accessed by the user, and wherein performing the action comprises:
determining the user is not accessing the first media asset;
retrieving the first media asset; and
generating a simultaneous display of the first media asset and the second media asset currently being accessed by the user.

9. A system for performing an action based on context of a feature in a media asset, the system comprising:
storage circuitry configured to:
 store a plurality of objects;
 store, in a context field of a data structure associated with a first object of the plurality of objects, a first context indicator, wherein progress towards a goal in a sporting event being close to the goal is stored as a first characteristic of the first context indicator; and store, in the context field of the data structure associated with the first object of the plurality of objects, a second context indicator, wherein progress towards the goal in the sporting event being far from the goal is stored as a second characteristic of the second context indicator; and control circuitry configured to:
receive at least one frame of the media asset;
determine a feature in the at least one frame of the media asset;
compare the feature to each of the stored plurality of objects to identify a first object of the stored plurality of objects that corresponds to the feature;
retrieve, from the context field of the data structure associated with the first object, a context indicator associated with the first object by:
determining, from data associated with the feature, a characteristic of the first object;
comparing the characteristic to the first and second characteristics of the first and second context indicators stored in the data structure associated with the first object to identify the first context indicator that corresponds to the characteristic; and
retrieving, as the context indicator associated with the first object, the first context indicator from the context field of the data structure associated with the first object;
retrieve, from a database of actions corresponding to context indicators, an action corresponding to the context indicator associated with the first object; and
perform the action corresponding to the context indicator associated with the first object.

10. The system of claim 9, wherein the control circuitry is further configured to:
create the feature;
associate the created feature with a plurality of media assets, wherein the plurality of media assets contain similar content;
store the created feature as the first object in a library of objects associated with the plurality of media assets; and
generate an overlay with the first object on the media asset.

11. The system of claim 9, wherein the control circuitry configured to determine the feature is further configured to:
analyze a pixel map associated with the at least one frame of the media asset;
analyze a group of pixels in the pixel map;
determine shared properties of a subset of pixels in the group of pixels; and
generate a table for the feature containing relative positions and properties of pixels in the subset of pixels.

12. The system of claim 9, wherein the feature is defined by a first table containing relative positions and properties of a first plurality of pixels, and wherein the control circuitry is further configured to:
store a tolerance factor;
access a first pixel position of a first pixel stored in the first table;
compute an upper limit based on multiplying coordinates of the first pixel position by the tolerance factor;

compute a lower limit based on dividing the coordinates of the first pixel position by the tolerance factor;
retrieve a second pixel position of one of a second plurality of pixels from a second table containing relative positions and properties of pixels for the first object;
compare coordinates of the second pixel position to a range of coordinates of the first pixel position defined by the lower limit to the upper limit;
determine the first pixel position matches the second pixel position when the coordinates of the second pixel position is within the range of coordinates of the first pixel position; and
in response to determining a predetermined number of the pixel positions corresponding to the first plurality of pixels in the first table match one of a plurality of pixel positions in the second table, determine the feature corresponds to the first object.

13. The system of claim 9, wherein the action associated with the context indicator relates to moving a current playback position to another playback position that includes the object, and wherein the control circuitry configured to perform the action is further configured to:
determine the another playback position based on the at least one frame containing the object;
move the current playback position to the another playback position; and
play the media asset from the another playback position.

14. The system of claim 9, wherein the action associated with the context indicator relates to alerting a user to a media asset listing with subject matter that corresponds to the first object, and wherein the control circuitry configured to perform the action is further configured to:
retrieve subject matter of the first object from a subject matter field of the data structure associated with the first object;
search for a first media asset listing associated with the retrieved subject matter; and
promote the first media asset listing among a plurality of displayed media asset listings.

15. The system of claim 9, wherein the action associated with the context indicator relates to presenting supplemental information related to the object, and wherein the control circuitry configured to perform the action is further configured to:
retrieve a pointer to a location of the supplemental information related to the object from a supplemental information field of the data structure associated with the object;
access the location of the supplemental information;
retrieve the supplemental information; and
generate a simultaneous display of the media asset and the supplemental information.

16. The system of claim 9, wherein the media asset is a first media asset, wherein the action is associated with presenting the first media asset to the user simultaneously with a second media asset currently being accessed by the user, and wherein the control circuitry configured to perform the action is further configured to:
determine the user is not accessing the first media asset;
retrieve the first media asset; and
generate a simultaneous display of the first media asset and the second media asset currently being accessed by the user.

* * * * *